United States Patent
Mitsunaga et al.

(10) Patent No.: US 7,189,796 B2
(45) Date of Patent: *Mar. 13, 2007

(54) AROMATIC POLYCARBONATE RESIN COMPOSITION

(75) Inventors: Masaki Mitsunaga, Chiyoda-ku (JP); Katsuhiko Hironaka, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/531,914

(22) PCT Filed: Oct. 29, 2003

(86) PCT No.: PCT/JP03/13865

§ 371 (c)(1),
(2), (4) Date: Apr. 19, 2005

(87) PCT Pub. No.: WO2004/039888

PCT Pub. Date: May 13, 2004

(65) Prior Publication Data

US 2005/0272903 A1    Dec. 8, 2005

(30) Foreign Application Priority Data

Nov. 1, 2002    (JP) .............................. 2002-319515

(51) Int. Cl.
*C08G 64/00*    (2006.01)

(52) U.S. Cl. .................. 528/196; 264/176.1; 264/219; 257/21.279

(58) Field of Classification Search ............. 264/176.1, 264/219; 257/E21.279; 528/196, 198
See application file for complete search history.

(56) References Cited

FOREIGN PATENT DOCUMENTS

JP    7-207134    *    8/1995
WO    03/010235 A1    2/2003

* cited by examiner

*Primary Examiner*—Terressa Boykin
(74) *Attorney, Agent, or Firm*—Wenderoth, Lind & Ponack, L.L.P.

(57) ABSTRACT

An object of the present invention is to provide an aromatic polycarbonate resin composition having good rigidity and good hydrolysis resistance.

The present invention is an aromatic polycarbonate resin composition comprising:
(A) 100 parts by weight of aromatic polycarbonate (component A)
(B) 0.1 to 20 parts by weight of layer silicate (component B) having 50 to 200 milliequivalents/100 g of cation exchange capacity and ion-exchanged by an organic onium ion represented by the following general formula (I):

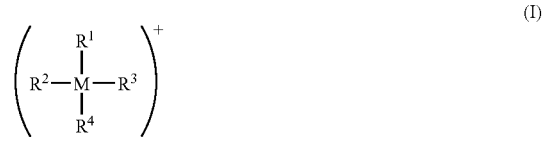

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other),
(C) 0.1 to 50 parts by weight of compound (component C) having an affinity for the component A and having a hydrophilic component, and
(D) 0.005 to 1 part by weight of ester (component D) of a higher fatty acid and a polyhydric alcohol.

25 Claims, No Drawings

AROMATIC POLYCARBONATE RESIN COMPOSITION

FIELD OF THE INVENTION

The present invention relates to an aromatic polycarbonate resin composition in which a layer silicate ion-exchanged by an organic onium ion is finely dispersed. More specifically, it relates to a novel aromatic polycarbonate resin composition having high rigidity and comprising an aromatic polycarbonate in which a layer silicate ion-exchanged by an organic onium ion having a specific molecular structure is finely dispersed, the composition having significantly improved environmental stability under a high temperature and high humidity condition, i.e., hydrolysis resistance; and to a production method of the composition. Suitably, the present invention also relates to the resin composition having better thermal stability and a production method thereof.

Further, the present invention relates to use of a specific layer silicate in an aromatic polycarbonate resin composition. The present invention further relates to an additive for improving the physical properties of an aromatic polycarbonate resin. In addition, the present invention also relates to a molded article produced by injection-molding an aromatic polycarbonate resin composition.

DESCRIPTION OF THE PRIOR ART

An aromatic polycarbonate having a carbonic ester bond in a recurring unit generally has excellent heat resistance, mechanical properties, impact resistance and dimensional stability and is used in a wide variety of fields of office automation equipment, automobiles, electric and electronic parts and the like. Along with a recent technological trend toward reductions in weight, thickness, length and size, the aromatic polycarbonate is required to have higher rigidity in many fields.

As means for improving the rigidity (flexural modulus) of a thermoplastic resin, it has heretofore been generally practiced to mix a fibrous reinforcing material such as glass fibers or an inorganic filler into the thermoplastic resin. However, the conventional method has such problems that the specific gravity of a product becomes large and that the appearance of the surface of the product becomes poor.

Meanwhile, as one of techniques for achieving a high flexural modulus by a relatively small amount of a filler, a resin composition comprising a thermoplastic resin in which a layer silicate, more preferably a layer silicate whose interlayer ions have been ion-exchanged by various organic onium ions, is finely dispersed as an inorganic filler is proposed. Further, a resin composition comprising a combination of an aromatic polycarbonate and a layer silicate whose interlayer ions have been ion-exchanged by various organic onium ions is also known (refer to Patent Publications 1 to 6).

As the organic onium ions for ion-exchanging the interlayer ions of the layer silicate, an organic onium ion having an alkyl group having at least 12 carbon atoms as represented by a dimethyl dioctadecyl ammonium ion and an ammonium ion having a polyethylene glycol chain are proposed (refer to Patent Publications 2 and 3). Further, for all thermoplastic resins, it has been proposed that a quaternary ammonium ion having 15 to 30 carbon atoms is preferred as the organic onium ion (refer to Patent Publication 7) and that a quaternary ammonium ion (or phosphonium ion) comprising one organic group of which has at least 8 carbon atoms and other three organic groups of which have 1 to 4 carbon atoms is preferred as the organic onium ion (refer to Patent Publication 8).

However, all these proposals suggest nothing about the hydrolysis resistance of an aromatic polycarbonate resin composition. In actuality, an aromatic polycarbonate resin composition containing a layer silicate ion-exchanged by such an organic onium ion has a problem in hydrolysis resistance. Thus, an improvement in the hydrolysis resistance of the aromatic polycarbonate resin composition containing the layer silicate is an important technical object to be achieved for the purpose of further increasing its practicality.

| | |
|---|---|
| (Patent Publication 1) | JP-A 3-215558 |
| (Patent Publication 2) | JP-A 7-207134 |
| (Patent Publication 3) | JP-A 7-228762 |
| (Patent Publication 4) | JP-A 7-331092 |
| (Patent Publication 5) | JP-A 9-143359 |
| (Patent Publication 6) | JP-A 10-60160 |
| (Patent Publication 7) | JP-A 2002-88255 |
| (Patent Publication 8) | International Publication Pamphlet No. WO99/32403 |

SUMMARY OF THE INVENTION

Therefore, a primary object of the present invention is to provide an aromatic polycarbonate resin composition having good rigidity and good hydrolysis resistance and a production method thereof. More suitably, an object of the present invention is to provide the resin composition which also has good thermal stability and a production method thereof. Another object of the present invention is to provide a method of using a specific layer silicate for obtaining an aromatic polycarbonate resin composition having good rigidity and hydrolysis resistance. Still another object of the present invention is to provide an additive for obtaining an aromatic polycarbonate resin composition having good rigidity, hydrolysis resistance and thermal stability. Still another object of the present invention is to provide an article molded from an aromatic polycarbonate resin composition and having good appearance, particularly a light reflecting material.

The present inventors have made intensive studies so as to achieve the above objects and found a fact that a resin composition which comprises (A) an aromatic polycarbonate as a main and (B) a layer silicate ion-exchanged by a specific organic onium ion shows significantly suppressed hydrolysis under a high temperature and high humidity condition, has good rigidity even when the content of the silicate is relatively small, and can produce a molded article having a good surface appearance. Then, the present inventors have made further intensive studies so as to complete the present invention.

That is, firstly, the present invention is an aromatic polycarbonate resin composition (hereinafter may be referred to as "resin composition I") comprising:

(A) an aromatic polycarbonate (component A)

(B) a layer silicate (component B) having 50 to 200 milliequivalents/100 g of cation exchange capacity and ion-exchanged by an organic onium ion represented by the following general formula (I):

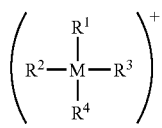
(I)

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), the content of the component B being 0.1 to 20 parts by weight based on 100 parts by weight of the component A, (C) a compound (component C) having an affinity for the aromatic polycarbonate (component A) and having a hydrophilic component, the content of the component C being 0.1 to 50 parts by weight based on 100 parts by weight of the component A, and (D) a partial ester and/or a full ester (component D) of a higher fatty acid and a polyhydric alcohol, the component D being 0.005 to 1 part by weight based on 100 parts by weight of the component A.

Secondly, the present invention is an aromatic polycarbonate resin composition (hereinafter may be referred to as "resin composition II") comprising:

(A) an aromatic polycarbonate (component A)

(B) a layer silicate (component B) having 50 to 200 milliequivalents/100 g of cation exchange capacity and ion-exchanged by an organic onium ion represented by the following general formula (I):

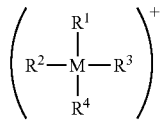
(I)

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), the content of the component B being 0.1 to 20 parts by weight based on 100 parts by weight of the component A, and (C) a compound (component C) having an affinity for the aromatic polycarbonate (component A) and having a hydrophilic component, the content of the component C being 0.1 to 50 parts by weight based on 100 parts by weight of the component A.

An embodiment such as the resin composition I comprising all of the components A to D is a more suitable embodiment in the present invention. However, even in the case of an embodiment such as the resin composition II excluding the component D so as to solve problems caused by the component D, an aromatic polycarbonate resin composition having rigidity, thermal stability and hydrolysis resistance which have heretofore not been achieved is provided.

Thirdly, the present invention is a method for producing an aromatic polycarbonate resin composition by mixing (A) 100 parts by weight of aromatic polycarbonate (component A) with (B) 0.1 to 20 parts by weight of layer silicate ion-exchanged by an organic onium ion, wherein as the layer silicate, a layer silicate (component B) having 50 to 200 milliequivalents/100 g of cation exchange capacity and ion-exchanged by an organic onium ion represented by the following general formula (I):

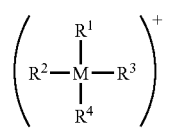
(I)

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), is used so as to improve hydrolysis resistance.

Fourthly, the present invention is use of a layer silicate (component B) having 50 to 200 milliequivalents/100 g of cation exchange capacity and ion-exchanged by an organic onium ion represented by the following general formula (I):

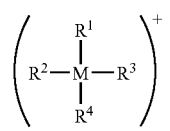
(I)

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), in an aromatic polycarbonate resin composition comprising (A) 100 parts by weight of aromatic polycarbonate (component A) and (B) 0.1 to 20 parts by weight of layer silicate ion-exchanged by an organic onium ion, to prevent deterioration in hydrolysis resistance and to impart rigidity.

Fifthly, the present invention is use of a layer silicate (component B) having 50 to 200 milliequivalents/100 g of cation exchange capacity and ion-exchanged by an organic onium ion represented by the following general formula (I):

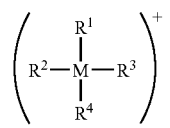
(I)

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), for producing an aromatic polycarbonate resin composition which comprises (A) 100 parts by weight of aromatic polycarbonate (component A) and (B) 0.1 to 20 parts by weight of layer silicate ion-exchanged by an organic onium ion and which has improved hydrolysis resistance.

As a method of improving the hydrolysis resistance of an aromatic polycarbonate resin composition, a variety of methods have heretofore been proposed. For example, it is known that the hydrolysis resistance can be improved by mixing a compound such as an epoxy compound, an oxetane compound or a silane compound (including a siloxane compound) into the composition. However, the improvement by the mixing may adversely affect other physical properties, and it cannot be always said that it is a practical method. In the present invention, according to the kind of the organic onium ion of the layer silicate as the component B, the hydrolysis resistance of the aromatic polycarbonate resin composition comprising the layer silicate is improved. This method of improving the hydrolysis resistance can minimize an influence on other physical properties and is very useful.

Sixthly, the present invention is an additive for improving the physical properties of an aromatic polycarbonate resin, the additive comprising (C) 100 parts by weight of compound (component C) having an affinity for an aromatic polycarbonate (component A) and having a hydrophilic component and (B) 1 to 300 parts by weight of layer silicate (component B) having 50 to 200 milliequivalents/100 g of cation exchange capacity and ion-exchanged by an organic onium ion represented by the following general formula (I):

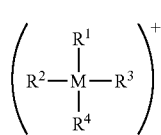

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other).

Seventhly, the present invention is a molded article produced by injection-molding the above resin composition I or II.

BEST MODE FOR CARRYING OUT THE INVENTION

<Resin Composition I>

The resin composition I is an aromatic polycarbonate resin composition comprising:

(A) an aromatic polycarbonate (component A)

(B) a layer silicate (component B) having 50 to 200 milliequivalents/100 g of cation exchange capacity and ion-exchanged by an organic onium ion represented by the following general formula (I):

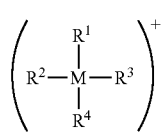

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), the content of the component B being 0.1 to 20 parts by weight based on 100 parts by weight of the component A, (C) a compound (component C) having an affinity for the aromatic polycarbonate (component A) and having a hydrophilic component, the content of the component C being 0.1 to 50 parts by weight based on 100 parts by weight of the component A, and (D) a partial ester and/or a full ester (component D) of a higher fatty acid and a polyhydric alcohol, the component D being 0.005 to 1 part by weight based on 100 parts by weight of the component A.

Hereinafter, the components constituting the resin composition I and contents thereof will be further described in turn.

<About Component A>

The component A in the resin composition I of the present invention is an aromatic polycarbonate which constitutes the resin composition I as a main component. A representative aromatic polycarbonate is obtained by reacting a dihydric phenol with a carbonate precursor. Illustrative examples of a method of reacting the compounds include interfacial polycondensation, melt transesterification, solid-phase transesterification of a carbonate prepolymer, and ring-opening polymerization of a cyclic carbonate compound.

Specific examples of the above dihydric phenol include hydroquinone, resorcinol, 4,4'-biphenol, 1,1-bis(4-hydroxyphenyl)ethane, 2,2-bis(4-hydroxyphenyl)propane (commonly referred to as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene, and 9,9-bis(4-hydroxy-3-methylphenyl)fluorene. Of these, a bis(4-hydroxyphenyl)alkane, particularly bisphenol A (hereinafter may be abbreviated as "BPA"), is generally used.

In the present invention, in addition to a bisphenol A based polycarbonate which is a general-purpose aromatic polycarbonate, a special aromatic polycarbonate using other dihydric phenol can be used as the component A for the purpose of attaining better hydrolysis resistance.

For example, an aromatic polycarbonate (homopolymer or copolymer) using, as a portion or all of a dihydric phenol component, 4,4'-(m-phenylenediisopropylidene)diphenol (hereinafter may be abbreviated as "BMP"), 1,1-bis(4-hydroxyphenyl)cyclohexane, 1,1-bis(4-hydroxyphenyl-3,3,5-trimethylcyclohexane) (hereinafter may be abbreviated as "Bis-TMC"), 9,9-bis(4-hydroxyphenyl)fluorene and 9,9-bis(4-hydroxy-3-methylphenyl)fluorene (may be abbreviated as "BCF") is suitable for applications whose requirements for a dimensional change caused by water absorption and form stability are particularly stringent, because the polymer itself has good hydrolysis resistance. These dihydric phenols other than BPA are preferably used in an amount of 5 mol % or more, particularly preferably 10 mol % or more of the whole dihydric phenol component constituting the aromatic polycarbonate.

Particularly, when high rigidity and better hydrolysis resistance are required, the component A is particularly suitably any of the following copolycarbonates (1) to (3).
(1) Copolycarbonate wherein BPM constitutes 20 to 80 mol % (more suitably 40 to 75 mol %, much more suitably 45 to 65 mol %) and BCF constitutes 20 to 80 mol % (more suitably 25 to 60 mol %, much more suitably 35 to 55 mol %) out of 100 mol % of the dihydric phenol component constituting the aromatic polycarbonate.
(2) Copolycarbonate wherein BPA constitutes 10 to 95 mol % (more suitably 50 to 90 mol %, much more suitably 60 to 85 mol %) and BCF constitutes 5 to 90 mol % (more suitably 10 to 50 mol %, much more suitably 15 to 40 mol %) out of 100 mol % of the dihydric phenol component constituting the aromatic polycarbonate.
(3) Copolycarbonate wherein BPM constitutes 20 to 80 mol % (more suitably 40 to 75 mol %, much more suitably 45 to 65 mol %) and Bis-TMC constitutes 20 to 80 mol % (more suitably 25 to 60 mol %, much more suitably 35 to 55 mol %) out of 100 mol % of the dihydric phenol component constituting the aromatic polycarbonate.

These special aromatic polycarbonates may be used alone or mixed together as appropriate before use. Further, these aromatic polycarbonates may be mixed with the generally used bisphenol A based aromatic polycarbonate and used.

Production methods and properties of these special aromatic polycarbonates are described in detail in JP-A 6-172508, 8-27370, 2001-55435 and 2002-117580, for example.

Of the above various aromatic polycarbonates, those having water absorption and Tg (glass transition temperature) within the following ranges by controlling copolymerization composition or the like are particularly suitable in the field of light reflecting materials such as mirrors and reflectors which must have good form stability, because the polymers themselves have good hydrolysis resistance and a significantly excellent low-warping tendency after molding.
(i) Aromatic polycarbonate having a water absorption of 0.05 to 0.15%, preferably 0.06 to 0.13%, and a Tg of 120 to 180° C.
(ii) Aromatic polycarbonate having a Tg of 160 to 250° C., preferably 170 to 230° C., and a water absorption of 0.10 to 0.30%, preferably 0.13 to 0.30%, more preferably 0.14 to 0.27%.

The water absorption of the aromatic polycarbonate is a value of the water absorption of a disk-shaped test piece with a diameter of 45 mm and a thickness of 3.0 mm which is measured in accordance with ISO62-1980 after the piece is kept immersed in water of 23° C. for 24 hours. Meanwhile, the Tg (glass transition temperature) is a value measured by a differential scanning calorimeter (DSC) in accordance with JIS K7121.

Meanwhile, as the above carbonate precursor, a carbonyl halide, a carbonate ester or a haloformate is used. Specific examples thereof include phosgene, diphenyl carbonate, and dihaloformate of a dihydric phenol.

In producing the polycarbonate from such a dihydric phenol and a carbonate precursor by an interfacial polymerization method, a catalyst, a terminal blocking agent and an antioxidant to prevent oxidation of the dihydric phenol may be used as required. Further, the aromatic polycarbonate may be a branched polycarbonate copolymerized with a polyfunctional aromatic compound having 3 or more functional groups. Illustrative examples of the polyfunctional aromatic compound having 3 or more functional groups include 1,1,1-tris(4-hydroxyphenyl)ethane and 1,1,1-tris(3,5-dimethyl-4-hydroxyphenyl)ethane.

When the polyfunctional compound producing the branched polycarbonate is contained, its amount is 0.001 to 1 mol %, preferably 0.005 to 0.9 mol %, particularly preferably 0.01 to 0.8 mol %, based on the total amount of the aromatic polycarbonate. Further, in the case of a melt transesterification method in particular, a branch structure may be produced as a side reaction. The amount of the branch structure is also 0.001 to 1 mol %, preferably 0.005 to 0.9 mol %, particularly preferably 0.01 to 0.8 mol %, based on the total amount of the aromatic polycarbonate and can be calculated by a $^1$H-NMR measurement.

Further, the aromatic polycarbonate as the component A may be a polyester carbonate copolymerized with an aromatic or aliphatic (including alicyclics) bifunctional carboxylic acid, a copolycarbonate copolymerized with a bifunctional alcohol (including alicyclics), and a polyester carbonate copolymerized with the bifunctional carboxylic acid and the bifunctional alcohol. A mixture of two or more of the obtained aromatic polycarbonates can also be used without any problem.

As the aliphatic bifunctional carboxylic acid, $\alpha,\omega$-dicarboxylic acid is preferred. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid; and alicyclic dicarboxylic acids such as cyclohexanedicarboxylic acid. As the bifunctional alcohol, an alicyclic diol is more suitable. Illustrative examples of the alicyclic diol include cyclohexane dimethanol, cyclohexane diol and tricyclodecane dimethanol.

Further, in the present invention, a polycarbonate-polyorganosiloxane copolymer copolymerized with a polyorganosiloxane unit can also be used.

The aromatic polycarbonate which serves as the component A in the resin composition of the present invention may be a mixture of two or more of various aromatic polycarbonates including the above polycarbonates using different dihydric phenols, the above polycarbonate containing the branch component, the above polyester carbonates and the polycarbonate-polyorganosiloxane copolymer. In addition, a mixture of two or more of polycarbonates produced by different production methods and polycarbonates using different terminal blocking agents can also be used.

The polymerization reaction of the aromatic polycarbonate by an interfacial polycondensation method is generally a reaction between a dihydric phenol and phosgene in the presence of an acid binding agent and an organic solvent. As the acid binding agent, an alkali metal hydroxide such as sodium hydroxide or potassium hydroxide or an amine compound such as pyridine is used, for example. As the organic solvent, a halogenated hydrocarbon such as methylene chloride or chlorobenzene is used, for example. Further, for the purpose of accelerating the reaction, a catalyst such as a tertiary amine, a quaternary ammonium compound or a quaternary phosphonium compound, e.g., triethylamine, tetra-n-butyl ammonium bromide and tetra-n-butyl phosphonium bromide can be used. In that case, the reaction temperature is generally 0 to 40° C., the reaction time is about 10 minutes to 5 hours, and the pH during the reaction is preferably kept at 9 or higher.

Further, in the polymerization reaction, a terminal blocking agent is generally used. As the terminal blocking agent, a monofunctional phenol can be used. As the monofunctional phenol, monofunctional phenols such as phenol, p-tert-butyl phenol and p-cumyl phenol are preferably used. Illustrative examples of the monofunctional phenols further include decyl phenol, dodecyl phenol, tetradecyl phenol, hexadecyl phenol, octadecyl phenol, eicosyl phenol, docosyl phenol, and triacontyl phenol. The terminal blocking agents may be used alone or in admixture of two or more.

A reaction by a melt transesterification method is generally transesterification between a dihydric phenol and a carbonate ester. It is carried out by a method comprising mixing the dihydric phenol with the carbonate ester under heating in the presence of an inert gas and distilling out a produced alcohol or phenol. The reaction temperature ranges from 120° C. to 350° C. in most cases, although varying depending on the boiling point of the produced alcohol or phenol. In the late stage of the reaction, the pressure of the reaction system is reduced to about $1.33 \times 10^3$ to 13.3 Pa so as to facilitate distilling out the produced alcohol or phenol. The reaction time is about 1 to 4 hours.

Illustrative examples of the above carbonate ester include esters of an aryl group with 6 to 10 carbon atoms which may have a substituent, an aralkyl group and an alkyl group having 1 to 4 carbon atoms. Of these, diphenyl carbonate is preferred.

Further, a polymerization catalyst may be used to increase a polymerization rate. As the polymerization catalyst, alkali metal compounds such as sodium hydroxide, potassium hydroxide, a sodium salt of a dihydric phenol and a potassium salt of a dihydric phenol; alkaline earth metal compounds such as calcium hydroxide, barium hydroxide and magnesium hydroxide; and nitrogen-containing basic compounds such as tetramethylammonium hydroxide, tetraethylammonium hydroxide, trimethylamine and triethylamine can be used. In addition, catalysts used in an esterification reaction and a transesterification reaction such as alkoxides of alkali (earth) metals, organic acid salts of alkali (earth) metals, boron compounds, germanium compounds, antimony compounds, titanium compounds and zirconium compounds can be used. The catalysts may be used alone or in combination of two or more. These polymerization catalysts are used in an amount of preferably $1 \times 10^{-8}$ to $1 \times 10^{-3}$ equivalents, more preferably $1 \times 10^{-7}$ to $5 \times 10^{-4}$ equivalents, per mole of the dihydric phenol used as a raw material.

In the reaction by the melt transesterification method, a compound such as 2-chlorophenylphenyl carbonate, 2-methoxycarbonylphenylphenyl carbonate or 2-ethoxycarbonylphenylphenyl carbonate can be added in the late stage of the polycondensation reaction or after completion of the polycondensation reaction so as to decrease the phenolic terminal groups of the produced polycarbonate.

Further, in the melt transesterification method, a deactivator which neutralizes the activity of the catalyst is preferably used. The deactivator is preferably used in an amount of 0.5 to 50 moles per mole of the remaining catalyst. Further, it is preferably used in an amount of 0.01 to 500 ppm, more preferably 0.01 to 300 ppm, particularly preferably 0.01 to 100 ppm, based on the polycarbonate after polymerization. Preferred examples of the deactivator include a phosphonium salt such as tetrabutylphosphonium dodecylbenzenesulfonate and an ammonium salt such as tetraethylammonium dodecylbenzylsulfate.

The viscosity average molecular weight of the aromatic polycarbonate which serves as the component A is not limited. However, when the viscosity average molecular weight is lower than 10,000, strength and the like deteriorate, while when it is higher than 50,000, moldability deteriorates. Thus, the viscosity average molecular weight is preferably 10,000 to 50,000, more preferably 12,000 to 30,000, much more preferably 14,000 to 28,000. In this case, a polycarbonate whose viscosity average molecular weight is out of the above range can be mixed in such an amount that moldability and the like are retained. For example, it is possible to mix a high-molecular-weight aromatic polycarbonate component having a viscosity average molecular weight of higher than 50,000.

To calculate the viscosity average molecular weight in the present invention, a specific viscosity ($\eta_{SP}$) calculated by the following expression:

$$\text{Specific Viscosity } (\eta_{SP}) = (t - t_0)/t_0$$

($t_0$ is the number of seconds taken by methylene chloride to drop, and t is the number of seconds taken by the sample solution to drop) is firstly determined from a solution prepared by dissolving 0.7 g of aromatic polycarbonate in 100 ml of methylene chloride at 20° C. by use of an Ostwald's viscometer, and a viscosity average molecular weight M is calculated from the obtained specific viscosity ($\eta_{SP}$) by the following expression:

$$\eta_{SP}/c = [\eta] + 0.45 \times [\eta]^2 c \quad ([\eta] \text{ is a limiting viscosity})$$

$$[\eta] = 1.23 \times 10^{-4} M^{0.83}$$

$$c = 0.7$$

The viscosity average molecular weight of the resin composition of the present invention is measured in the following manner. That is, the composition is dissolved in methylene chloride whose weight is 20 to 30 times larger than that of the composition, the soluble part is collected by filtration with celite, and the solution is then removed from the soluble part which is then fully dried so as to obtain the part soluble in methylene chloride in a solid form. A specific viscosity ($\eta_{SP}$) at 20° C. is determined from a solution prepared by dissolving 0.7 g of the solid in 100 ml of methylene chloride by use of an Ostwald's viscometer, and its viscosity average molecular weight M is calculated by the above expression.

<About Component B>

The component B which constitutes the resin composition of the present invention is a layer silicate having 50 to 200 milliequivalents/100 g of cation exchange capacity and ion-exchanged by an organic onium ion represented by the following general formula (I):

(I)

In the above formula (I), M represents a nitrogen atom or a phosphorus atom. Further, $R^1$ and $R^2$ each represent an alkyl group having 6 to 16 carbon atoms and may be the same as or different from each other. $R^3$ and $R^4$ each represent an alkyl group having 1 to 4 carbon atoms and may be the same as or different from each other. In the above formula (I), $R^1$ and $R^2$ may be linear or branched. When $R^3$ and $R^4$ are a butyl group respectively, they may be linear or branched.

These $R^1$ and $R^2$ are preferably an alkyl group having 7 to 14 carbon atoms, more preferably an alkyl group having 7 to 12 carbon atoms, much more preferably an alkyl group with 8 to 11 carbon atoms which have a particularly excellent effect of improving hydrolysis resistance. Meanwhile, $R^3$ and $R^4$ are preferably an alkyl group having 1 to 3 carbon atoms, more preferably a methyl group or an ethyl group, much more preferably a methyl group. Therefore, an organic onium ion represented by the general formula (I) wherein $R^1$ and $R^2$ are an alkyl group having 8 to 11 carbon atoms and $R^3$ and $R^4$ are a methyl group is the most suitable. Further, M is preferably a nitrogen atom.

Specific examples of the organic onium ion include dimethyl dioctyl ammonium, dimethyl didecyl ammonium, dimethyl didodecyl ammonium, dimethyl ditetradecyl ammonium, dimethyl dihexadecyl ammonium, diethyl didodecyl ammonium, diethyl ditetradecyl ammonium, diethyl dihexadecyl ammonium, dibutyl dioctyl ammonium, dibutyl didecyl ammonium and dibutyl didodecyl ammonium. Further, specific examples thereof also include phosphonium ions resulting from substituting nitrogen atoms in the above ammonium ions with a phosphorus atom. Of these, the dimethyl dioctyl ammonium ion and the dimethyl didecyl ammonium ion are preferred, and the dimethyl didecyl ammonium ion is particularly preferred.

As the organic onium ion for ion-exchanging the layer silicate, a dimethyl dioctadecyl ammonium ion has conventionally been known. However, a layer silicate ion-exchanged by the organic onium ion causes poor hydrolysis resistance of the resin composition and therefore does not achieve the objects of the present invention.

The layer silicate as the component B is a silicate or clay which comprises layers each comprising a combination of an $SiO_4$ tetrahedron sheet structure composed of an $SiO_2$ chain and an octahedron sheet structure containing Al, Mg, Li and the like, with exchangeable cations coordinated in between the layers. Representative examples of the silicate or clay include smectite-based minerals, vermiculite, halloysite and swellable micas. Specific examples of the smectite-based minerals include montmorillonite, hectorite, fluorine hectorite, saponite, beidellite and stebensite. Specific examples of the swellable micas include swellable synthetic micas such as Li-type fluorine taeniolite, Na-type fluorine taeniolite, Na-type tetrasilicon fluorine mica, and Li-type tetrasilicon fluorine mica. These layer silicates may be naturally occurring silicates or synthetic silicates. The synthetic silicates are produced by hydrothermal synthesis, melt synthesis or a solid-state reaction, for example.

Of layer silicates, smectite-based clay minerals such as montmorillonite and hectorite and fluorine micas having swellability such as Li-type fluorine taeniolite, Na-type fluorine taeniolite and Na-type tetrasilicon fluorine mica are suitably used from the viewpoint of a cation exchange capacity and the like, and montmorillonite obtained by purifying bentonite and a synthetic fluorine mica are more suitable from the viewpoint of purity and the like. Of these, the synthetic fluorine mica which provides good mechanical properties is particularly preferred.

The cation exchange capacity (also referred to as "cation exchange capability") of the layer silicate as the component B must be 50 to 200 milliequivalents/100 g, preferably 80 to 150 milliequivalents/100 g, more preferably 100 to 150 milliequivalents/100 g. The cation exchange capacity is measured as a CEC value by a Schöllenberger improved method which is a nationally official method as a soil standard analysis method. The general outline of the method is as follows. A layer silicate sample as a sample is filled in an infiltration tube having a length of 12 cm and an inner diameter of 1.3 cm of a soil extracting device to a thickness of about 8 cm, and 100 ml of 1N ammonium acetate aqueous solution having a pH of 7 is used and infiltrated over 4 to 20 hours so as to exchange and extract cations. Then, the sample is washed with 100 ml of 80% methanol having a pH of 7 so as to remove excessive ammonium acetate. Then, the sample is washed with 100 ml of 10% potassium chloride aqueous solution so as to exchange and extract ammonium ions ($NH_4^+$) adsorbed to the sample. Finally, the quantity of $NH_4^+$ in the extract is determined by a steam distillation method or a Conway trace diffusion method so as to calculate CEC. As the soil extracting device, one which is commercially available as a glass-made set can be used. A Schöllenberger method on which the improved method is based is described in Soil Sci., 59, 13 to 24 (1945).

The cation exchange capacity of the layer silicate must be at least 50 milliequivalents/100 g so as to attain good dispersibility into the aromatic polycarbonate which is the component A. When it is larger than 200 milliequivalents/100 g, thermal degradation of the aromatic polycarbonate becomes remarkable, and an influence on thermal degradation of the aromatic polycarbonate resin composition of the present invention becomes significant. The layer silicate preferably has a pH of 7 to 11.5. When the value of the pH is larger than 11.5, the thermal stability of the aromatic polycarbonate resin composition of the present invention becomes liable to deteriorate.

The organic onium ion in the layer silicate which is the component B is generally treated as a salt with an anion such as a halogen ion, a hydroxide ion or an acetate ion. A salt compound of the organic onium ion is reacted with a layer silicate, whereby the layer silicate as the component B is obtained.

That is, the component B can be produced by adding an organic onium ion compound (salt compound of the organic onium ion) represented by the above formula (I) to a layer silicate dispersed in a polar solvent and collecting an ion exchanged compound to be precipitated. In general, in the ion exchange reaction, it is common to add the organic onium ion compound in an amount of 1.0 to 1.5 equivalents per equivalent of the ion exchange capacity of the layer silicate so as to exchange nearly all interlayer metal ions with the organic onium ions. However, it is also effective for inhibiting thermal degradation of the aromatic polycarbonate to control the proportion of exchange based on the ion exchange capacity to within a given range. Thus, the proportion of ion exchange by the organic onium ion is preferably at least 40% (40 to 100%) based on the ion exchange capacity of the layer silicate. The proportion of exchange by the organic onium ion can be calculated by determining a reduction in the weight of an exchanged compound by thermal decomposition of the organic onium ion by use of a thermogravimetry measuring device.

In the case of the layer silicate ion-exchanged by the organic onium ion, the organic onium ion salt compound is apt to stick to and remain in the layer silicate. As a counter ion for the ion, a chloride ion or a bromide ion is generally used. Further, salts of these counter ions and alkali metal ions present between the layers of the layer silicate before ion exchange also remain in the layer silicate after ion exchange. The thus remaining salts degrade the hydrolysis resistance of the aromatic polycarbonate resin composition. Therefore, it is important to minimize the amount of the salts in order to improve the hydrolysis resistance. The most effective and easiest method for reducing the amount is rinsing the layer silicate after ion exchange sufficiently with water. More specifically, it is preferably rinsed with water such that the proportion of the chloride ion or bromide ion which is the counter ion is not higher than 0.05% by weight (more suitably 0.001 to 0.05% by weight) based on 100% by weight of the layer silicate ion-exchanged by the organic onium ion.

<About Component C>

A suitable component C which is contained in the resin composition I of the present invention is a compound having an affinity for the aromatic polycarbonate which is the component A and having a hydrophilic component. The component C produces good affinity for both the aromatic polycarbonate (component A) and the layer silicate (component B). The affinity for the two components improves the compatibilities of these two components and allows the layer silicate to be dispersed in the aromatic polycarbonate which serves as a matrix finely and stably.

The effect of the component C with respect to dispersion of the layer silicate is assumed to be similar to that of a compatibilizer for a polymer alloy which is used for making different polymers compatible with each other. Thus, the component C is preferably a high molecular compound, i.e., a polymer, rather than a low molecular compound. Further, the polymer is more advantageous since it is excellent in thermal stability during kneading and processing. The average number of the recurring units of the polymer is preferably 5 or more, more preferably 10 or more. Meanwhile, an upper limit on the number average molecular weight of the polymer is preferably not higher than 2,000,000. As long as the number average molecular weight does not exceed the upper limit, good moldability is obtained.

When the component C which is contained in the resin component I of the present invention is a polymer, its basic structure can be exemplified by the following examples.

a) When α is a component having an affinity for the aromatic polycarbonate and β is a hydrophilic component, a graft copolymer comprising α and β (it may be equally selected that α is a principal chain and β is a graft chain or that α is a graft chain and β is a principal chain), a block copolymer comprising α and β (the number of block segments may be 2 or more such as di- and tri-, and a radial block type and the like are included), and a random copolymer comprising α and β.

b) When α is a component having an affinity for the aromatic polycarbonate and β is a hydrophilic component, a polymer in which the function of α is expressed by the whole polymer and β is contained in α.

In the above structure a), α and β represent a polymer segment unit and a monomer unit. However, the α component is preferably the polymer segment unit from the viewpoint of an affinity for the aromatic polycarbonate. Meanwhile, the above structure b) is a case where a sufficient affinity for the aromatic polycarbonate is not expressed by α alone but a good affinity is expressed by combining α and β. There is also a case where a good affinity for the aromatic polycarbonate is expressed by α alone and the affinity is further improved by combining α with β. Thus, these structures a) and b) may partially overlap.

As the component C in the present invention, one showing a high affinity for the aromatic polycarbonate even with the α component alone and showing a higher affinity for the polycarbonate with a combination of α and β in the whole component C is suitable.

Next, the component (hereinafter may be referred to as "α") having an affinity for the aromatic polycarbonate in the component C will be described in detail. As described above, since it is assumed that the component C serves in a similar manner to a compatibilizer in a polymer alloy, α is required to have a similar affinity for a polymer to that of the compatibilizer. Thus, α can be roughly classified into a non-reactive type and a reactive type.

When the non-reactive type has the following factors, a good affinity is attained. That is, it is desired that there be, between the aromatic polycarbonate and α, factors such as (1) similarity in chemical structures, (2) closeness of solubility parameters (a difference in solubility parameter of within 1 $(cal/cm^3)^{1/2}$, i.e., within about 2.05 $(MPa)^{1/2}$ is a standard) and (3) an intermolecular interaction (such as hydrogen bonding and an interionic interaction) and a pseudo-attractive interaction peculiar to a random polymer. These factors are also known as measures for determining an affinity between a compatibilizer and a polymer which forms a base of a polymer alloy. The reactive type may be those having functional groups having reactivity with the aromatic polycarbonate in compatibilizers. Illustrative examples of the functional groups having reactivity with the aromatic polycarbonate include a carboxyl group, a carboxylic anhydride group, an epoxy group, an oxazoline group, an ester group, an ester bond, a carbonate group and a carbonate bond.

Meanwhile, when there is a good affinity between the aromatic polycarbonate and α, there is observed a behavior that a mixture of the aromatic polycarbonate and a shows a single glass transition temperature (Tg) or a behavior that the Tg of the aromatic polycarbonate moves toward the Tg of α. Consequently, the component (α) having an affinity for the aromatic polycarbonate can be distinguished by the behaviors.

As described above, the component (α) having an affinity for the aromatic polycarbonate in the component C is preferably a non-reactive type. In particular, it preferably exhibits a good affinity by closeness of solubility parameters. This is because the non-reactive type is superior to a reactive type in an affinity for the aromatic polycarbonate (Component A). Further, the reactive-type has a problem that thermal degradation of the polymer is promoted by a side reaction when reactivity is increased to an excessive degree.

The solubility parameters of the aromatic polycarbonate and α in the component C preferably have the following relationship. That is, when the solubility parameter of the aromatic polycarbonate is $\delta_A$ $((MPa)^{1/2})$ and the solubility parameter of α in the component C or the solubility parameter of the whole component C is $\delta_\alpha$ $((MPa)^{1/2})$, they preferably have a relationship represented by the following formula.

$$\delta_\alpha = \delta_A \pm 2 \ ((MPa)^{1/2})$$

For example, since the solubility parameter of the aromatic polycarbonate which is the component A is generally about 10 $(cal/cm^3)^{1/2}$ (that is, about 20.5 $((MPa)^{1/2})$), $\delta_\alpha$ is preferably 18.5 to 22.5 $((MPa)^{1/2})$, more preferably 19 to 22 $((MPa)^{1/2})$.

Specific examples of a polymer component which satisfies the solubility parameter $\delta_\alpha$ include vinyl polymers such as a styrene polymer, an alkyl(meth)acrylate polymer and an acrylonitrile polymer (as typified by, for example, a polystyrene, a styrene-maleic anhydride copolymer, a polymethyl methacrylate, a styrene-methyl methacrylate copolymer and a styrene-acrylonitrile copolymer). A polymer component having high Tg is preferably used so as to retain the heat resistance of the composition of the present invention.

To calculate the solubility parameter, a theoretical estimation technique based on group contribution methods using the value of Small described in "Polymer Handbook—Fourth Edition" (A WILEY-INTERSCIENCE PUBLICATION, 1999) can be employed. As described above, the Tg of the aromatic polycarbonate can be measured by a differential scanning calorimeter (DSC) in accordance with JIS K7121.

The amount of the component a having an affinity for the aromatic polycarbonate which is the component A is preferably not smaller than 5 wt %, more preferably not smaller than 10 wt %, much more preferably not smaller than 30 wt %, particularly preferably not smaller than 50 wt %, in the component C. Since the whole component C may be constituted by α, an upper limit on the amount of α can be 100 wt %.

Meanwhile, the hydrophilic component (hereinafter may be referred to as "β") in the component C is selected from monomers having hydrophilic groups (organic atomic groups which show a strong interaction with water) and hydrophilic polymer components (polymer segments). The hydrophilic groups are widely known per se and exemplified by the following groups.
1) groups with strong hydrophilicity: —$SO_3H$, —$SO_3M$, —$OSO_3H$, —$OSO_3M$, —COOM, —$NR_3X$ (R: alkyl group, X: halogen atom, M: alkali metal, —$NH_4$) and the like.
2) groups with rather weak hydrophilicity: —COOH, —$NH_2$, —CN, —OH, —$NHCONH_2$ and the like.
3) groups with no hydrophilicity or weak hydrophilicity: —$CH_2OCH_3$, —$OCH_3$, —$COOCH_3$, —CS and the like.

As the component C which is contained in the resin composition I of the present invention, a component having a hydrophilic group classified into the above 1) or 2) is used. Above all, the hydrophilic group of the above 2) is preferred because it shows better thermal stability at the time of melt-processing of the aromatic polycarbonate. When hydrophilicity is too high, thermal degradation of the aromatic polycarbonate is liable to occur. This is because the hydrophilic group directly reacts with a carbonate bond and causes a thermal decomposition reaction.

The hydrophilic group may be a monovalent group or a polyvalent group having at least two valences. When the component C is a polymer, a functional group with at least two valences refers to a group which does not constitute the principal chain of the polymer, and a group which constitutes the principal chain is distinguished, as a bond, from a functional group. More specifically, a group added to an atom such as carbon which constitutes the principal chain, group of a side chain and a terminal group of a molecular chain are functional groups even if they have two or more valences.

A more specific indicator of the hydrophilic group is a solubility parameter. It is widely known that the larger the value of the solubility parameter, the higher hydrophilicity becomes. A solubility parameter for a group can be calculated from cohesive energy ($E_{coh}$) for the group and a molar volume (V) for the group according to Fedors (refer to "Polymer Handbook—Fourth Edition" (A WILEY-INTERSCIENCE PUBLICATION), VII/p. 685, 1999, Polym. Eng. Sci., Vol. 14, pp. 147 and 472, 1974). Further, from the viewpoint of comparing only the degree of hydrophilicity, a numerical value ($E_{coh}/V$; hereinafter "$J/cm^3$" will be used as its unit) obtained by dividing the cohesive energy ($E_{coh}$) by the molar volume (V) can be used as an indicator of hydrophilicity.

The hydrophilic group contained in the hydrophilic component (β) of the component C preferably has an $E_{coh}/V$ of 600 or larger, more preferably 800 or larger. When the $E_{coh}/V$ is 800 or larger, it exceeds the $E_{coh}/V$ of a carbonate bond in the aromatic polycarbonate which is the component A, indicating that the hydrophilic group has higher hydrophilicity than the carbonate bond. The $E_{coh}/V$ is more preferably 900 or larger, much more preferably 950 or larger. Meanwhile, when hydrophilicity is too high, the thermal degradation of the aromatic polycarbonate is liable to occur as described above. Accordingly, the $E_{coh}/V$ is preferably 2,500 or smaller, more preferably 2,000 or smaller, much more preferably 1,500 or smaller.

As the hydrophilic component (β) in the component C, a hydrophilic polymer component (polymer segment) can also be selected. Illustrative examples of a hydrophilic polymer segment which can be β in the polymer which is the component C include a polyalkylene oxide, a polyvinyl alcohol, a polyacrylic acid, metal salts (including a chelate type) of a polyacrylic acid, a polyvinyl pyrrolidone, a polyacryl amide and a polyhydroxyethyl methacrylate. Of these, the polyalkylene oxide, polyvinyl alcohol, polyacrylic acid, polyvinyl pyrrolidone and polyhydroxyethyl methacrylate are preferred. These are suitable since good hydrophilicity and good thermal stability for the aromatic polycarbonate (component A) (inhibition of decomposition of the aromatic polycarbonate during melt-processing) are attained simultaneously. As the polyalkylene oxide, a polyethylene oxide and a polypropylene oxide are preferred.

In any case of the monomer having a hydrophilic group and the hydrophilic polymer component, β preferably has an acidic functional group (hereinafter may be simply referred to as "acidic group"). The acidic group inhibits thermal degradation at the time of melt-processing of the resin composition I of the present invention. Above all, an acidic group having no nitrogen atoms is more suitable. Suitable examples of the acidic group include a carboxyl group, a carboxylic anhydride group, a sulfonic group, a sulfinic group, a phosphonic group and a phosphinic group.

In contrast, a functional group having nitrogen atoms such as an amide group and an imide group may not inhibit the thermal degradation of the aromatic polycarbonate during melt-processing sufficiently. It is assumed that this is because the nitrogen atoms have basicity locally and cause thermal decomposition of the carbonate bond.

When β is a monomer having a hydrophilic group, the proportion of β in the component C is 60 to 10,000, preferably 70 to 8,000, more preferably 80 to 6,000, much more preferably 100 to 3,000, in terms of a functional group equivalent which is a molecular weight per function group. Meanwhile, when β is a hydrophilic polymer segment, the proportion of β is suitably 5 to 95 wt %, preferably 10 to 90 wt %, more preferably 30 to 70 wt %, much more preferably 30 to 50 wt %, based on 100 wt % of the component C.

Illustrative examples of a method for producing the organic compound (component C) which comprises the component (α) having an affinity for the aromatic polycarbonate and the hydrophilic component (β) include a method comprising copolymerizing a monomer of β with a monomer constituting α, a method comprising block- or graft-copolymerizing a polymer component of β with α, and a method comprising reacting β directly with α so as to add β to α.

Specific examples of the component C include a polymer having an affinity for the aromatic polycarbonate which is the component A and having an acidic functional group, a polymer having an affinity for the component A and having a polyalkylene oxide segment, a polymer having an affinity for the component A and having an oxazoline group, and a polymer having an affinity for the component A and having a hydroxyl group. These preferred polymers as the component C preferably have a weight average molecular weight of 10,000 to 1,000,000, more preferably 50,000 to 500,000. The weight average molecular weight is calculated as a value in terms of a polystyrene by a GPC measurement using a calibration straight line by a standard polystyrene resin.

<About Component C-1>

Of the foregoing components C, the polymer having an affinity for the aromatic polycarbonate and having an acidic functional group is preferred, and a more preferred polymer is a polymer having an affinity for the aromatic polycarbonate and having a functional group comprising a carboxyl group and/or a derivative thereof. Further, from the viewpoint of an effect of retaining the heat resistance of the aromatic polycarbonate, the polymer is preferably a polymer having an aromatic ring component in the principal chain and a polymer having a styrene component in the principal chain. From these viewpoints, a styrene-containing polymer (C-1 component) having a functional group comprising a carboxyl group and/or a derivative thereof is particularly suitable as the component C in the resin composition I of the present invention. The styrene-containing polymer refers to a polymer containing, as a polymer component, a recurring unit resulting from polymerization of an aromatic vinyl compound such as styrene.

The proportion of the functional group comprising a carboxyl group and/or a derivative thereof in the component C-1 is preferably 0.1 to 12 milliequivalents/g, more preferably 0.5 to 5 milliequivalents/g. 1 equivalent in the component C-1 means that 1 mole of carboxyl group exists, and its value can be calculated by back titration of potassium hydroxide or the like.

Illustrative examples of a functional group comprising a derivative of a carboxyl group include (i) a metal salt (including a chelate salt) resulting from substituting a hydroxyl group in a carboxyl group with a metal ion, (ii) an acid chloride resulting from substituting a hydroxyl group in a carboxyl group with a chlorine atom, (iii) an ester resulting from substituting a hydroxyl group in a carboxyl group with —OR (R is a monovalent hydrocarbon group), (iv) an acid anhydride resulting from substituting a hydroxyl group in a carboxyl group with —O(CO)R (R is a monovalent hydrocarbon group), (v) an amide resulting from substituting a hydroxyl group in a carboxyl group with —NR$_2$ (R is hydrogen or a monovalent hydrocarbon group) and (vi) an imide resulting from substituting hydroxyl groups in two carboxyl groups with =NR (R is hydrogen or a monovalent hydrocarbon group).

As a method for producing the styrene-containing polymer having a functional group comprising a carboxyl group and/or a derivative thereof (hereinafter simply referred to as "carboxyl-based groups"), conventionally known methods can be used. Illustrative examples of the methods include (a) a method comprising copolymerizing a monomer having a carboxyl-based group with a styrene-based monomer and (b) a method comprising bonding or copolymerizing a compound or monomer having a carboxyl-based group with a styrene-containing polymer.

In the above method (a), a variety of polymerization methods such as an anion living polymerization method and a group transfer polymerization method can be employed in addition to radical polymerization methods such as solution polymerization, suspension polymerization and bulk polymerization. Further, a method comprising forming a macromonomer and then carrying out polymerization can also be used. The copolymer can be used as copolymers of various forms such as an alternating copolymer, a block copolymer and a tapered copolymer in addition to a random copolymer. In the above method (b), a method can be generally employed that comprises adding a radical generator such as a peroxide or 2,3-dimethyl-2,3-diphenylbutane (generally referred to as "dicumyl") to a styrene-containing polymer or copolymer as required and reacting or copolymerizing them at high temperatures. The method thermally creates a reaction active spot in the styrene-containing polymer or copolymer and causes a compound or monomer which reacts with the active spot to react with the polymer or copolymer. Other methods of creating the active spot required for the reaction include irradiation of radiation or an electron beam and application of an external force by a mechanochemical technique. Further, a method comprising copolymerizing a monomer which creates the active spot required for the reaction in the styrene-containing copolymer in advance can also be used. Illustrative examples of the active spot for the reaction include an unsaturated bond, a peroxide bond, and a thermally stable nitroxide radical with high steric hindrance.

Illustrative examples of the compound or monomer having a carboxyl-based group include unsaturated monocarboxylic acids and derivatives thereof such as acrylic acid, methacrylic acid, acrylamide and methacrylamide, maleic anhydride, derivatives of maleic anhydride such as citraconic anhydride, N-phenyl maleimide and N-methyl maleimide, a glutarimide structure, and a chelate structure formed by acrylic acid and a polyvalent metal ion. Of these, a monomer having a functional group free of metal ions and a nitrogen atom is suitable, and a monomer having a carboxyl group or a carboxylic anhydride group, particularly maleic anhydride, is more suitable.

Further, as the styrene-based monomer compound, styrene, α-methyl styrene, o-methyl styrene, m-methyl styrene, p-methyl styrene, t-butyl styrene, α-methyl vinyl toluene, dimethyl styrene, chlorostyrene, dichlorostyrene, bromostyrene, dibromostyrene and vinyl naphthalene can be used. Styrene is particularly preferred. In addition, other compounds copolymerizable with these styrene-based monomer compounds, such as acrylonitrile and methacrylonitrile, can also be used as a copolymerizable component without any problems.

Suitable as the component C-1 in the present invention is a styrene-containing copolymer resulting from copolymerization of a monomer having a carboxyl-based group. This is because a relatively large number of carboxyl-based groups can be contained stably in the styrene-containing polymer. A more suitable embodiment is a styrene-containing copolymer resulting from copolymerization of a monomer having a carboxyl-based group and a styrene-based monomer, and a styrene-maleic anhydride copolymer is particularly suitable. Since this styrene-maleic anhydride copolymer has high compatibility with the ion components in the layer silicate and the aromatic polycarbonate, it can finely disperse the layer silicate (B) sufficiently and can finely disperse it even to a nano order by selecting a suitable condition. Further, due to the effect of the carboxylic anhydride group, good thermal stability can be obtained in a resin composition having a layer silicate, particularly an organomodified layered silicate. Further, since the copolymer itself has good thermal stability, it has high stability even against high-temperature conditions required for melt-processing of the aromatic polycarbonate resin.

The composition of the styrene-containing copolymer resulting from copolymerization of a monomer having a carboxyl-based group is not limited as long as the above condition for the proportion of β is satisfied. However, a copolymer comprising 1 to 30 wt % (particularly 5 to 25 wt %) of component from a monomer having a carboxyl-based group, 99 to 70 wt % (particularly 95 to 75 wt %) of styrene-based monomer compound component and 0 to 29 wt % of other copolymerizable compound component is preferably used, and a copolymer comprising 1 to 30 wt % (particularly 5 to 25 wt %) of monomer having a carboxyl-based group and 99 to 70 wt % (particularly 95 to 75 wt %) of styrene-based monomer compound is particularly preferred.

The molecular weight of the above component C-1 is not particularly limited. It preferably has a weight average molecular weight of 10,000 to 1,000,000, more preferably 50,000 to 500,000. The weight average molecular weight is calculated as a value in terms of a polystyrene by a GPC measurement using a calibration straight line by a standard polystyrene resin.

Another suitable component C is a styrene-containing copolymer (component C-2) containing an oxazoline group as a hydrophilic group. As a styrene-based monomer compound which forms the copolymer, styrene, α-methyl styrene, o-methyl styrene, m-methyl styrene, p-methyl styrene, t-butyl styrene, α-methyl vinyl toluene, dimethyl styrene, chlorostyrene, dichlorostyrene, bromostyrene, dibromostyrene and vinyl naphthalene can be used. In addition, other compounds copolymerizable with these compounds, e.g., acrylonitrile and methacrylonitrile, can also be used as a copolymerizable component without any problems. A specific example of a particularly suitable C-2 component is a styrene(2-isopropenyl-2-oxazoline)-styrene-acrylonitrile copolymer.

Further, another suitable component C is a polyether ester copolymer (component C-3) having a polyalkylene oxide segment. The polyether ester copolymer is a polymer produced by polycondensation of a dicarboxylic acid, an alkylene glycol and a poly(alkylene oxide) glycol and their derivatives. Particularly suitable as the component C-3 is a copolymer produced from a poly(alkylene oxide)glycol having a polymerization degree of 10 to 120 or a derivative thereof, an alkylene glycol containing at least 65 mol % of tetramethylene glycol or a derivative thereof and a dicarboxylic acid containing at least 60 mol % of terephthalic acid or a derivative thereof.

<About Component D>

The component D which is contained in the resin composition I is a partial ester and/or a full ester of a higher fatty acid and a polyhydric alcohol. The component D exerts an effect of further improving the hydrolysis resistance of the resin composition I. Although the cause of the improvement in the hydrolysis resistance is unknown, it is assumed that the component D has an effect of catching an ionic compound which causes hydrolysis and neutralizing the compound.

The higher fatty acid refers to an aliphatic carboxylic acid having 10 to 32 carbon atoms. Specific examples thereof include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanoic acid, docosanoic acid and hexacosanoic acid; and unsaturated aliphatic carboxylic acids such as palmitoleic acid, oleic acid, linoleic acid, linolenic acid, eicosenoic acid, eicosapentaenoic acid and cetoleic acid. Of these, an aliphatic carboxylic acid having 10 to 22 carbon atoms is preferred, and an aliphatic carboxylic acid having 14 to 20 carbon atoms is more preferred. A saturated aliphatic carboxylic acid having 14 to 20 carbon atoms, particularly stearic acid and palmitic acid, are particularly preferred. In general, an aliphatic carboxylic acid such as stearic acid is often a mixture containing other carboxylic acid components having different numbers of carbon atoms. In the above component D as well, an ester compound obtained from stearic acid or palmitic acid which is produced from natural oils and fats and has the form of a mixture containing other carboxylic acid components is preferably used.

Meanwhile, the polyhydric alcohol is more preferably a polyhydric alcohol having 3 to 32 carbon atoms. Specific examples of the polyhydric alcohol include glycerine, diglycerine, a polyglycerine (such as decaglycerine), pentaerythritol, dipentaerythritol, diethylene glycol and propylene glycol.

The higher fatty acid ester of the component D is more suitably a partial ester. Further, an acid value in the component D is preferably 20 or less (may virtually take 0), and a hydroxyl value is more preferably 20 to 500 (much more preferably 50 to 400). Further, an iodine value is preferably 10 or less (may virtually take 0). These characteristics can be determined by a method defined in JIS K 0070.

Of these, a partial ester of a higher fatty acid composed essentially of stearic acid and glycerine is particularly preferred as the component D. This partial ester is commercially available from, for example, Riken Vitamin Co., Ltd. with a trade name "RIKEMAL S-100A" and can be easily obtained from the market.

<Proportions of Components>

Next, the proportions (contents) of the above components in the resin composition I of the present invention will be described.

The proportion of the layer silicate which is the component B is 0.1 to 20 parts by weight, preferably 0.5 to 15 parts by weight, more preferably 0.5 to 12 parts by weight, particularly preferably 1 to 10 parts by weight, based on 100 parts by weight of the component A. When the proportion of the component B is lower than the above lower limit, an effect resulting from addition of the layer silicate is not fully exhibited, so that high rigidity cannot be attained. On the other hand, when the proportion of the component B is higher than the above upper limit, environmental stability is lowered by deterioration in the heat resistance and thermal stability of the resin composition disadvantageously.

The effect of improving the rigidity of the resin composition is affected by the content of inorganic materials in the component B (silicate) in the resin composition. In the resin composition of the present invention, the rigidity of an article molded from the resin composition can be improved significantly even if the content of the above inorganic materials is as low as 10 wt % or less of the total. Thus, the rigidity can be improved without adverse effects on other properties due to addition of the component B. Further, an improvement in hydrolysis resistance can be achieved by use of the component B which has been ion-exchanged by a specific organic onium ion.

Meanwhile, the component C, i.e., a compound having an affinity for the aromatic polycarbonate which is the component A and has a hydrophilic component, is preferably contained in an amount of 0.1 to 50 parts by weight based on 100 parts by weight of the component A. The proportion of the component C is more preferably 0.5 to 20 parts by weight, much more preferably 1 to 12 parts by weight, based on 100 parts by weight of the component A. Since good fine dispersion (nano dispersion) of the layer silicate and an improvement in thermal stability are achieved within the above range, an aromatic polycarbonate resin composition having higher rigidity and better thermal stability is provided. By the improvement in thermal stability, environmental stability under a high temperature and high humidity condition also becomes good.

The proportion of the partial ester and/or full ester of a higher fatty acid and a polyhydric alcohol as the component D is 0.005 to 1 part by weight, preferably 0.01 to 1 part by weight, more preferably 0.02 to 0.8 part by weight, much more preferably 0.03 to 0.5 part by weight, based on 100 parts by weight of the above component A. Within the above range, the environmental stability under a high temperature and high humidity condition is further improved. When the proportion of the component D is smaller than the above lower limit, the effect of further improving hydrolysis resistance is small, while when the proportion is larger than the above upper limit, thermal degradation of the component D itself is liable to occur disadvantageously.

<About Additional Components>

The resin composition I of the present invention may contain, as additional components, polymers other than the above components and other additives as required. Illustrative examples of polymers which can be the additional components include styrene-based resins and aromatic polyester resins other than the above component C.

As the styrene-based resins, a polystyrene (PS) (including a syndiotactic polystyrene), an impact-resistant polystyrene (HIPS), an acrylonitrile.styrene copolymer (AS resin), a methyl methacrylate.butadiene.styrene copolymer (MBS resin) and an acrylonitrile.butadiene.styrene copolymer (ABS resin) can be used. Of these, the ABS resin is the most preferable. These styrene-based resins can be used in admixture of two or more.

As the aromatic polyester resins, a polyethylene terephthalate (PET), a polypropylene terephthalate, a polybutylene terephthalate (PBT), a polyhexylene terephthalate, a polyethylene-2,6-naphthalate (PEN), a polybutylene naphthalate (PBN), a polyethylene-1,2-bis(phenoxy)ethane-4,4'-dicarboxylate, a polyethylene terephthalate copolymerized with 1,4-cyclohexane dimethanol (so-called PET-G), and copolyesters such as a polyethylene isophthalate/terephthalate and a polybutylene terephthalate/isophthalate can be used. Of these, the polyethylene terephthalate and the polyethylene-2,6-naphthalate are preferred. Further, when balanced moldability and mechanical properties are desired, the polybutylene terephthalate and the polybutylene naphthalate are preferred, and a blend or copolymer having a weight ratio of polybutylene terephthalate/polyethylene terephthalate of 2 to 10 is preferred. The molecular weight of the aromatic polyester resin is not particularly limited. Its intrinsic viscosity measured at 35° C. using o-chlorophenol as a solvent is 0.4 to 1.2, preferably 0.6 to 1.15.

Further, in addition to the above styrene-based resins and aromatic polyester resins, the resin composition I can contain amorphous thermoplastic resins and crystalline thermoplastic resins unless they impair the object and effect of the present invention. Further, if necessary, the resin composition I may also contain a flame retardant (such as a brominated epoxy resin, a brominated polystyrene, a brominated polycarbonate, a brominated polyacrylate, a monophosphate compound, a phosphate oligomer compound, a phosphonate oligomer compound, a phosphonitrile oligomer compound, a phosphonic amide compound, organic sulfonic acid alkali (earth) metal salts and a silicone-based flame retardant), a flame retarding aid (such as sodium antimonate and antimony trioxide), an anti-dripping agent (such as a polytetrafluoroethylene capable of forming fibrils), an antioxidant (such as a hindered phenol compound and a sulfur-based antioxidant), an ultraviolet absorber, a light stabilizer, a mold releasing agent, a sliding agent (such as PTFE particles), a colorant (such as pigments and dyes including carbon black and titanium oxide), a light diffusing agent (such as acryl crosslink particles, silicone crosslink particles, very thin glass flakes and calcium carbonate particles), an inorganic fluorescent material (such as a fluorescent material containing aluminates as base crystals), an antistatic agent, a conductant agent, a flow modifying agent, an inorganic or organic antibacterial agent, a photocatalyst-based stainproofing agent (such as titanium oxide fine particles and zinc oxide fine particles), an impact modifying agent typified by graft rubber, an infrared absorber (heat ray absorber), a photochromic agent and a fluorescent brightener.

Preferred examples of the above dyes include a perylene-based dye, a coumarin-based dye, a thioindigo-based dye, an anthraquinone-based dye, a thioxanthone-based dye, a ferrocyanide such as Prussian blue, a perinone-based dye, a quinoline-based dye, a quinacridone-based dye, a dioxazine-based dye, an iso-indolinone-based dye and a phthalocyanine-based dye. Further, various fluorescent dyes typified by an anthraquinone-based dye, a perylene-based dye, a coumarin-based dye, a thioindigo-based dye and a thioxanthone-based dye can also be named. Further, illustrative examples of the fluorescent brightener include a bisbenzoxazolyl-stilbene derivative, a bisbenzoxazolyl-naphthalene derivative, a bisbenzoxazolyl-thiophene derivative and a coumarin-derivative. Of these, the coumarin-derivative is particularly suitably used, and an example of commercial products of the coumarin derivative is HAKKOL PSR of HAKKOL CHEMICAL CO., LTD. The amount of the fluorescent brightener agent is preferably 0.0005 to 1 part by weight, more preferably 0.001 to 0.1 parts by weight, based on 100 parts by weight of the component A.

As titanium oxide, a white pigment of titanium dioxide is particularly suitable. The titanium dioxide is not particularly limited in its structure and production method, but a rutile type by a chlorine method is suitable. Titanium dioxide in the present invention is not particularly limited in its form, but a particulate form is more suitable. Its average particle diameter is preferably 0.01 to 0.4 μm, more preferably 0.1 to 0.3 μm. The average particle diameter refers to D50 (median system of particle diameter distribution) measured by an X-ray transmission method which is one of liquid-phase precipitation methods. Titanium dioxide may be surface-treated with an inorganic material typified by alumina. The amount of the inorganic material applied to the surface by the treatment is preferably 1 to 15 wt based on the surface-treated titanium oxide. To carry out the surface treatment, an oxide of silicon and oxides of metals such as titanium, zirconium, antimony, tin and zinc can also be used in addition to the aluminum oxide. Particularly, a surface treatment by silicon, i.e., $SiO_2$ is suitable. Further, as the surface treatment, a high density treatment or a low density (porous) treatment can be employed.

Further suitable titanium dioxide is surface-treated with an organic compound, because the surface treatment improves dispersibility of titanium dioxide and thermal stability of the resin composition. As the surface treatment agent, a surface treatment agent composed essentially of an amine compound, a silicone compound or a polyol compound can be used. Particularly, titanium dioxide coated with an alkyl alkoxysilane, a silane coupling agent or an alkyl hydrogen polysiloxane is preferred, because it has good thermal stability and good color. In particular, titanium dioxide coated with the alkyl hydrogen polysiloxane is suitably used. The amount of the organic compound used for the surface treatment is preferably not larger than 1 wt %, more preferably not larger than 0.6 wt %, much more preferably not larger than 0.4 wt %, based on 100 wt % of titanium dioxide. On the other hand, a lower limit on the amount of the organic compound is not smaller 0.05 wt %. Illustrative examples of a surface treatment method include a method comprising surface-treating titanium dioxide while grinding it, a method comprising mixing ground titanium dioxide with a surface treatment agent, and a method comprising adding titanium dioxide and a surface treatment agent separately during production of the resin composition so that titanium dioxide is eventually surface-treated with the surface treatment agent. Any of the above methods can be used in the present invention.

When titanium dioxide is used as an ordinary colorant, it is used in an amount of 0.001 part by weight to less than 3 parts by weight based on 100 parts by weight of the component A. Meanwhile, when the content of titanium dioxide is made relatively high so as to impart light reflectivity to a molded article, the content of titanium dioxide is preferably 3 to 30 parts by weight, more preferably 3 to 25 parts by weight, much more preferably 5 to 20 parts by weight, particularly preferably 7 to 18 parts by weight, based on 100 parts by weight of the component A.

Illustrative examples of the ultraviolet absorber in the present invention include a benzophenone-based ultraviolet absorber, a benzotriazole-based ultraviolet absorber, a hydroxyphenyltriazine-based ultraviolet absorber, a cyclic imino ester based ultraviolet absorber and a cyanoacrylate-based ultraviolet absorber. Any of these can be used. Specific examples of the benzotriazole-based ultraviolet absorber include 2-(2-hydroxy-5-t-octylphenyl)benzotriazole, 2-(2-hydroxy-3,5-dicumylphenyl)phenyl benzotriazole and 2,2'-methylenebis[4-(1,1,3,3-tetramethylbutyl)-6-(2H-benzotriazol-2-yl)phenol]. Specific examples of the hydroxyphenyltriazin-based ultraviolet absorber include 2-(4,6-diphenyl-1,3,5-triazin-2-yl)-5-hexyloxyphenol and 2-(4,6-bis(2,4-dimethylphenyl)-1,3,5-triazin-2-yl)-5-hexyloxyphenol. Specific examples of the cyclic imino ester based ultraviolet absorber include 2,2'-p-phenylenebis (3,1-benzoxazin-4-one) and 2,2'-(4,4'-diphenylene)bis(3,1-benzoxazin-4-one). Specific examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane.

Further, the above ultraviolet absorber may be a polymer-type ultraviolet absorber resulting from copolymerization of an ultraviolet absorbing monomer with the structure of a radical polymerizable monomer compound and/or a light stabilizing monomer with a monomer such as an alkyl(meth)acrylate. A suitable example of the above ultraviolet absorbing monomer is a compound containing a benzotriazole skeleton, a benzophenone skeleton, a triazine skeleton, a cyclic imino ester skeleton or a cyanoacrylate skeleton in an ester substituent of a (meth)acrylate. Of the above ultraviolet absorbers, the benzotriazole-based ultraviolet absorber and the hydroxyphenyltriazine-based ultraviolet absorber are preferred from the viewpoint of ultraviolet absorbability, and the cyclic imino ester based ultraviolet absorber and the cyanoacrylate-based ultraviolet absorber are preferred from the viewpoints of heat resistance and color (transparency). The above ultraviolet absorbers may be used alone or in admixture of two or more. The amount of the ultraviolet absorber is 0.01 to 2 parts by weight, preferably 0.03 to 2 parts by weight, more preferably 0.02 to 1 part by weight, much more preferably 0.05 to 0.5 parts by weight, based on 100 parts by weight of the component A. Further, the resin composition of the present invention may also contain a hindered amine based light stabilizer. The light stabilizer is preferably used in an amount of 0.0005 to 3 parts by weight based on 100 parts by weight of the component A.

The resin composition I preferably contains a phosphorus-containing heat stabilizer. Illustrative examples of the phosphorus-containing heat stabilizer include phosphates such as trimethyl phosphate, phosphates such as triphenyl phosphate, trisnonylphenyl phosphate, distearyl pentaerythritol diphosphite, bis(2,6-di-t-butyl-4-methylphenyl)pentaerythritol diphosphite, tris(2,4-di-t-butylphenyl)phosphite, 2,2-methylenebis(4,6-di-t-butylphenyl)octyl phosphate and bis (2,4-di-t-butylphenyl)pentaerythritol diphosphite, and phosphonites such as tetrakis(2,4-di-t-butylphenyl)-4,4'-biphenylene diphosphonite. The phosphorus-containing heat stabilizer is preferably contained in an amount of 0.001 to 1 wt %, more preferably 0.01 to 0.5 wt %, much more preferably 0.01 to 0.2 wt %, based on 100 wt % of the whole composition. By addition of the phosphorus-containing heat stabilizer, thermal stability is further improved and good moldability can be obtained.

Further, when the resin composition I of the present invention contains a hindered phenol based antioxidant, its suitable content range is the same as that of the above phosphorus-containing heat stabilizer.

In the present invention, it is also possible for improving hydrolysis resistance to add a conventionally known compound as a hydrolysis improving agent for the aromatic polycarbonate resin in such an amount that does not impair the objects of the present invention. Illustrative examples of the compound include an epoxy compound, an oxetane compound, a silane compound and a phosphonic acid component, and suitable examples thereof include the epoxy compound and the oxetane compound in particular. Suitable examples of the epoxy compound include an alicyclic epoxy compound typified by 3,4-epoxycyclohexylmethyl-3',4'-epoxycyclohexyl carboxylate and a silicon-atom-containing epoxy compound typified by 3-glycidylpropoxy-triethoxysilane. The hydrolysis improving agent is preferably used in an amount of not larger than 1 part by weight based on 100 parts by weight of the component A.

The resin composition I has high rigidity, good thermal stability and good hydrolysis resistance. Further, it also has advantages that it has good moldability and gives a molded article having a good surface appearance, particularly good surface smoothness.

<Resin Composition II>

The resin composition II is an aromatic polycarbonate resin composition comprising:

(A) an aromatic polycarbonate (component A)

(B) a layer silicate (component B) having 50 to 200 milliequivalents/100 g of cation exchange capacity and ion-exchanged by an organic onium ion represented by the following general formula (I):

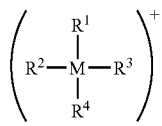

(I)

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), the content of the component B being 0.1 to 20 parts by weight based on 100 parts by weight of the component A, and (C) a compound (component C) having an affinity for the aromatic polycarbonate (component A) and having a hydrophilic component, the content of the component C being 0.1 to 50 parts by weight based on 100 parts by weight of the component A.

In the resin composition II, the kinds and contents of the components A, B and C are the same as those of the above resin composition I. However, since the resin composition II does not contain the component D, the component B of the resin composition II is preferably a more suitable embodiment from the viewpoint of hydrolysis resistance. That is, in the resin composition II, particularly, $R^1$ and $R^2$ in the above formula (I) are preferably an alkyl group having 8 to 11 carbon atoms. Further, the resin composition II can contain the same additional components as those the resin composition I can contain in the same amounts as those of the additional components the resin composition I can contain. The resin composition II has high rigidity, good thermal stability and good hydrolysis resistance. Further, it also has advantages that it has good moldability and gives a molded article having a good surface appearance, particularly good surface smoothness.

<Method for Producing Aromatic Polycarbonate Resin Composition>

The present invention includes a method for producing an aromatic polycarbonate resin composition by mixing (A) 100 parts by weight of aromatic polycarbonate (component A) with (B) 0.1 to 20 parts by weight of layer silicate ion-exchanged by an organic onium ion, wherein as the layer silicate, a layer silicate (component B) having 50 to 200 milliequivalents/100 g of cation exchange capacity and ion-exchanged by an organic onium ion represented by the following general formula (I):

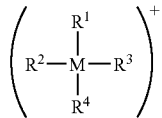

(I)

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), is used so as to improve hydrolysis resistance. More suitably, the present invention includes a method for producing pellets comprising the resin composition.

In the method, the kinds and contents of the components A and B are the same as those of the resin composition I. Particularly, $R^1$ and $R^2$ in the general formula (I) relating to the component B are preferably an alkyl group having 7 to 14 carbon atoms.

The above aromatic polycarbonate resin composition is preferably produced by further mixing 0.1 to 50 parts by weight of (C) compound (component C) having an affinity for the aromatic polycarbonate (component A) and having a hydrophilic component based on 100 parts by weight of the component A. The kind and content of the component C are the same as those of the component C in the resin composition I. The component C is preferably a polymer having an affinity for the aromatic polycarbonate (component A) and having a functional group comprising a carboxyl group and/or a derivative thereof. The above component C is preferably a styrene-containing polymer (C-1) having a functional group comprising a carboxyl group and/or a derivative thereof. The above component C-1 is preferably a styrene-maleic anhydride copolymer.

The components A and B are preferably mixed together by melt kneading. Further, it is preferable to melt-knead the component B and the component C in advance so as to obtain a melt kneaded product which is then melt-kneaded with the component A. The above aromatic polycarbonate resin composition is preferably produced by further mixing 0.005 to 1 part by weight of (D) partial ester and/or full ester (component D) of a higher fatty acid and a polyhydric alcohol based on 100 parts by weight of the component A. The kind and content of the component D are the same as those of the component D in the resin composition I.

Mixing can be carried out by subjecting the above components and arbitrary components to premixing (dry mixing is particularly suitable) and then to melt kneading. The mixed resin composition can be pelletized thereafter. As means for the premixing, a Nauter mixer, a V-type blender, a Henschel mixer, mechanochemical equipment, an extrusion mixer and the like can be used. In the premixing, granulation can be carried out by use of an extrusion granulator, briquetting machine or the like in some cases.

After the premixing, the resulting mixture is melt-kneaded by a melt-kneader typified by a vented twin-screw extruder and then pelletized by a device such as a pelletizer. In addition to the above vented twin-screw extruder, the melt-kneader may be a Banbury mixer, a kneading roll or a thermostat agitator but is preferably a multi-screw extruder typified by a vented twin-screw extruder. By use of the multi-screw extruder, the layer silicate is finely dispersed into the component A which is a matrix resin by a more powerful shearing force.

To produce the resin composition I or II of the present invention, a method is preferred that comprises melt-kneading the component B and the component C (suitably the component C-1) in advance so as to obtain a melt kneaded product and then melt-kneading the melt kneaded product with the aromatic polycarbonate which is the component A. By the melt-kneading method, fine dispersion, preferably nano-order dispersion, of the layer silicate is achieved. Further, the melt-kneading method is preferred from a practical standpoint since it has an effect of improving the thermal stability of the aromatic polycarbonate.

It is needless to say that the effect of the present invention is exhibited by other mixing methods. For example, there is a method which comprises mixing pellets of a resin composition comprising the components A and D with pellets obtained by melt-kneading the components B and C in advance in a molding machine (such as an injection molding machine) by feeding the pellets to the molding machine simultaneously.

Illustrative examples of advantageous production methods of the resin composition I or II of the present invention include (i) a method comprising melt-kneading the components B and C in a vented twin-screw extruder, pelletizing the resulting mixture and then melt-kneading the obtained pellets with the component A and (ii) a method comprising melt-kneading the components B and C in a vented twin-screw extruder by feeding them through its main feeding port and then feeding a portion or all of the component A into the mixture of the components B and C through a feeding port provided in the middle portion of the twin-screw extruder. In these methods comprising melt-kneading the components B and C in advance, a portion of the component A may be involved in the melt-kneading.

The component D can be added at any stage. For example, any of a method comprising mixing the component D with the component A in advance and then mixing the resulting mixture with other components, a method comprising adding the component D while melt-kneading the components B and C and a method comprising adding the component D in the final pelletization step can be selected.

When an influence by outside dust must be reduced in pelletization, it is preferable to clean the atmosphere around the extruder. The obtained pellets can take a general shape such as a cylindrical shape, a prismatic shape and a spherical shape and a general size. More suitably, the pellets are in the shape of a cylinder (including an elliptic cylinder, as a matter of course), and the diameter of the cylinder is 1 to 5 mm (more preferably 2 to 3.3 mm) and the length of the cylinder is 1 to 30 mm (more preferably 2.5 to 3.5 mm).

<Use of Component B in Resin Composition>

The present invention includes use of (or a method of using) a layer silicate (component B) having 50 to 200 milliequivalents/100 g of cation exchange capacity and ion-exchanged by an organic onium ion represented by the following general formula (I):

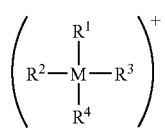

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), in an aromatic polycarbonate resin composition comprising (A) 100 parts by weight of aromatic polycarbonate (component A) and (B) 0.1 to 20 parts by weight of layer silicate ion-exchanged by an organic onium ion, for the purposes of preventing deterioration in hydrolysis resistance and imparting rigidity.

In the use, the kinds and contents of the components A and B are the same as those of the components A and B in the resin composition I. According to the present invention, by use of the component B as the layer silicate, rigidity can be imparted while deterioration in the hydrolysis resistance of the aromatic polycarbonate resin composition is prevented.

In the above use, the aromatic polycarbonate resin composition preferably further contains 0.1 to 50 parts by weight of (C) compound (component C) having an affinity for the aromatic polycarbonate (component A) and having a hydrophilic component based on 100 parts by weight of the component A. The kind and content of the component C are the same as those of the component C in the resin composition I.

In the above use, the aromatic polycarbonate resin composition is preferably produced by further mixing 0.005 to 1 part by weight of (D) partial ester and/or full ester (component D) of a higher fatty acid and a polyhydric alcohol based on 100 parts by weight of the component A. The kind and content of the component D are the same as those of the component D in the resin composition I.

<Use of Component B for Producing Resin Composition>

The present invention includes use of (or a method of using) a layer silicate (component B) having 50 to 200 milliequivalents/100 g of cation exchange capacity and ion-exchanged by an organic onium ion represented by the following general formula (I):

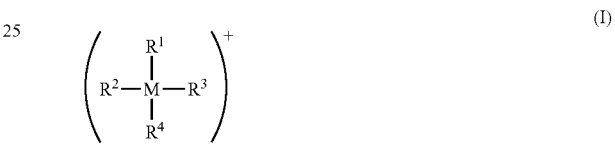

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), for producing an aromatic polycarbonate resin composition which comprises (A) 100 parts by weight of aromatic polycarbonate (component A) and (B) 0.1 to 20 parts by weight of layer silicate ion-exchanged by an organic onium ion and which has improved hydrolysis resistance.

In the above use, the kinds and contents of the components A and B are the same as those of the components A and B in the resin composition I. According to the present invention, by use of the component B as the layer silicate, an aromatic polycarbonate resin composition having rigidity and improved hydrolysis resistance can be produced.

In the above use, the aromatic polycarbonate resin composition preferably further contains 0.1 to 50 parts by weight of (C) compound (component C) having an affinity for the aromatic polycarbonate (component A) and having a hydrophilic component based on 100 parts by weight of the component A. The kind and content of the component C are the same as those of the component C in the resin composition I.

In the above use, the aromatic polycarbonate resin composition is preferably produced by further mixing 0.005 to 1 part by weight of (D) partial ester and/or full ester (component D) of a higher fatty acid and a polyhydric alcohol based on 100 parts by weight of the component A. The kind and content of the component D are the same as those of the component D in the resin composition I.

<Additive for Improving Physical Properties>

The present invention includes an additive for improving the physical properties of an aromatic polycarbonate resin, the additive comprising (C) 100 parts by weight of compound (component C) having an affinity for an aromatic polycarbonate (component A) and having a hydrophilic component and (B) 1 to 300 parts by weight (preferably 30 to 150 parts by weight, more preferably 50 to 120 parts by weight) of layer silicate (component B) having 50 to 200 milliequivalents/100 g of cation exchange capacity and ion-exchanged by an organic onium ion represented by the following general formula (I):

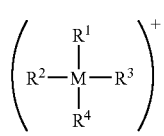

(I)

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other).

In the additive, the kinds of the components C and B are the same as those of the components C and B in the resin composition I. According to the present invention, by use of the component B as the layer silicate, the physical properties such as rigidity and hydrolysis resistance of an aromatic polycarbonate resin composition can be improved.

<Molded Article>

A variety of products (molded articles) can be produced by injection-molding the resin composition I or II of the present invention. The injection-molded articles can be obtained by using, in addition to ordinary injection molding methods, injection molding methods such as injection compression molding, injection press molding, gas assist injection molding, foam molding (including a method of injecting a supercritical fluid), insert molding, in-mold coating molding, heat insulating mold molding, quick heating/cooling mold molding, two color molding, sandwich molding and ultrahigh-speed injection molding as appropriate according to purposes. The advantages of these various molding methods are already widely known. Further, as a molding system, either of a cold runner system and a hot runner system can be selected.

Further, the resin compositions I and II of the present invention can also be used in the form of extrusion-molded articles of various profiles, sheets and films by extrusion molding. Further, to mold the sheets and the films, an inflation method, a calendering method or a casting method can also be used. Further, they can be molded into a thermal shrinkable tube by a specific stretching operation. In addition, the resin compositions I and II of the present invention can be formed into molded articles by rotational molding and blow molding.

Further, the resin compositions I and II of the present invention are useful in various applications such as optical disks, various electronic and electric devices, office automation equipment, automobile parts, machine parts, agricultural materials, fishing materials, shipping containers, packaging containers and miscellaneous goods.

The resin molded article of the present invention can be imparted with other functions by surface modification. The surface modification is means for forming a new layer on the surface of the resin molded article, e.g., deposition (such as physical vapor deposition and chemical vapor deposition), plating (such as electroplating, electroless plating and hot-dip plating), painting, coating and printing, and methods used for general resin molded articles can be employed.

Illustrative examples of a method of laminating a metal layer or a metal oxide layer on the surface of the resin molded article include a vapor deposition method, a spraying method and a plating method. Illustrative examples of the vapor deposition method include physical vapor deposition methods such as vacuum deposition, sputtering and ion plating, and chemical vapor deposition (CVD) methods such as a thermal CVD method, a plasma CVD method and an photo-CVD method. Illustrative examples of the spraying method include an atmospheric plasma spraying method and a low-pressure plasma spraying method. Illustrative examples of the plating method include an electroless plating (chemical plating) method, a hot-dip plating method and an electroplating method. As the electroplating method, a laser plating method can be used.

Of the above methods, the vapor deposition method and the plating method are preferred in forming the metal layer of the resin molded article of the present invention, and the vapor deposition method is particularly preferred in forming the metal oxide layer of the resin molded article of the present invention. The vapor deposition method and the plating method may be used in combination. For example, a method comprising performing electroplating by use of a metal layer formed by the vapor deposition method can be used.

The aromatic polycarbonate resin compositions I and II of the present invention have good rigidity, good thermal stability, good surface smoothness and good hydrolysis resistance. Therefore, as described above, molded article members resulting from covering the surfaces of molded articles comprising the resin compositions with various metals are useful as light reflecting members such as mirrors and reflectors and have satisfactory practicability. The light reflecting members can be used in a variety of devices incorporating light reflecting members. Illustrative examples of image data processing devices incorporating a mirror include cameras, copying machines, Scanners, printers, laser scanning information readers, reflective display devices and projectors. Illustrative examples of light energy processing devices using a mirror include a solar collector. Further, illustrative examples of general mirrors include rearview mirrors and side mirrors for automobiles and curved mirrors on roads. The mirrors may have a flat shape, a concave shape or a convex shape and may be formed by a number of surfaces such as polygon mirrors. The mirrors may be used in a fixed or movable state.

Reflector reflect light from a light source in a specific direction. Illustrative examples of devices incorporating the reflectors include lights or lamps for automobiles such as headlights, brake lamps and blinkers, flashlights, illuminating lamps and lamps for projectors.

The mirrors and reflectors must have good form stability and must also have heat resistance when close to a light source. When heat resistance is particularly required, the copolycarbonate (2) or an aromatic polycarbonate which satisfies the above characteristics (ii) mentioned in the description of the above component A is suitable. Therefore, according to the present invention, there is provided a light reflecting material which comprises a molded article member obtained by covering at least one surface of a molded article made of the resin composition I or II with a metal, the component A in the composition being an aromatic polycarbonate having a Tg of 160 to 250° C. (preferably 170 to 230° C.) and a water absorption of 0.10 to 0.30% (preferably 0.13 to 0.30%, more preferably 0.14 to 0.27%). More suitably, in the light reflecting material to be provided, the component A is a copolycarbonate wherein BPA constitutes 10 to 95 mol % (more suitably 50 to 90 mol %, much more suitably 60 to 85 mol %) and BCF constitutes 5 to 90 mol % (more suitably 10 to 50 mol %, much more suitably 15 to 40 mol %) out of 100 mol % of a dihydric phenol component constituting the aromatic polycarbonate.

Further, the resin compositions I and II of the present invention are also suitably used in molded article members which reflect light without having the surfaces of molded articles covered with metals. The molded article members are suitably achieved by further introducing a relatively large amount of titanium dioxide into the resin compositions I and II. A description about this titanium dioxide is the same as that given above. Further, when the resin compositions contain titanium dioxide, they are often used near a light source in particular, and the resins are directly exposed to light and heat emitted from the light source. Thus, the resin compositions preferably contain an ultraviolet absorber and a hindered phenol based or phosphorus based heat stabilizer. Their contents are the same as described above. Further, since the resin compositions are used near a light source, the copolycarbonate (2) or an aromatic polycarbonate which satisfies the above characteristics (ii) mentioned in the description of the above component A is suitable, as in the case of the light reflecting material comprising a metal-covered molded article member. Therefore, according to the present invention, there is provided a light reflecting material which comprises a molded article comprising the resin composition I or II which further contains 3 to 30 parts by weight of titanium dioxide based on 100 parts by weight of the component A, the component A in the composition being an aromatic polycarbonate having a Tg of 160 to 250° C. and a water absorption of 0.10 to 0.30%. More suitably, in the light reflecting material to be provided, the component A is a copolycarbonate wherein BPA constitutes 10 to 95 mol % and BCF constitutes 5 to 90 mol % out of 100 mol % of a dihydric phenol component constituting the aromatic polycarbonate (preferred numerical ranges thereof are the same as those for the above light reflecting material comprising a metal-covered molded article member). The light reflecting material is suitable for use in various light-emitting switches and meters and backlights of liquid crystal displays.

EXAMPLES

Hereinafter, Examples and Comparative Examples will be presented so as to describe the present invention more specifically. However, the present invention shall not be limited by them in any way. Evaluations on resin compositions were made by the following methods (1) to (7). All "parts" in the following description mean "parts by weight" unless otherwise specified.

(1) Content of Layer Silicate (Inorganic Material)

Using a resin composition, a test piece (size: 127 mm in length×12.7 mm in width×6.4 mm in thickness) was molded by use of an injection molding machine (product of TOSHIBA MACHINE CO., LTD., trade name: IS-150EN) at a cylinder temperature of 260° C., a mold temperature of 80° C. and a molding cycle of 40 seconds. The molded test piece was cut and put in a crucible so as to be weighed, heated to 600° C., kept at the temperature for 6 hours and then left to cool down, and the incineration residue remaining in the crucible was weighed so as to measure the amount of a layer silicate (inorganic material) in the resin composition. That is, since the properties such as a flexural modulus (rigidity) of the resin composition are influenced by the proportion of the inorganic material, the proportions of inorganic materials in test pieces were measured in all Examples and Comparative Examples 2 and 3 and are shown in Tables 1 to 5 as the proportion (wt %) of the inorganic material in the component B. However, in the case of Examples 14 and 15, the proportion was calculated by subtracting the proportion of titanium dioxide from the incineration residue.

(2) Viscosity Average Molecular Weight, Decreasing Ratio ($\Delta M_{ratio}$) of Viscosity Average Molecular Weight after High temperature and High Humidity Test The viscosity average molecular weight of a test piece (size: 127 mm in length×12.7 mm in width×6.4 mm in thickness) of the same shape which was molded under the same conditions as those in the above (1) was measured by the method described in the above text. Further, the viscosity average molecular weight of the test piece (test piece after the treatment) after the test piece was left to stand in a pressure cooker at a temperature of 105° C. and a relative humidity of 100% for 10 hours and then at a temperature of 23° C. and a relative humidity of 50% for 24 hours and the viscosity average molecular weight of the test piece (test piece before the treatment) after the test piece was left to stand at a temperature of 23° C. and a relative humidity of 50% for 74 hours were measured, and the decreasing ratio ($\Delta M_{ratio}$) of the viscosity average molecular weight after the high temperature and high humidity test was calculated in accordance with the following expression.

$\Delta M_{ratio}$=100×[(viscosity average molecular weight of test piece before treatment)−(viscosity average molecular weight of test piece after treatment)/(viscosity average molecular weight of test piece before treatment)]

The smaller this numerical value is, the better the hydrolysis resistance of a molded resin composition is.

(3) Surface Condition of Test Piece after High Temperature and High Humidity Test A test piece (size: 127 mm in length×12.7 mm in width× 6.4 mm in thickness) of the same shape which was molded under the same conditions as those in the above (1) was treated under the same conditions as those in the above (2). The surface condition of the treated test piece was observed visually, and the test piece was evaluated as ○ when abnormalities in smoothness such as blisters and wrinkles were not observed on the surface at all and as x when abnormalities in smoothness were observed.

(4) Flexural Modulus

The flexural modulus (MPa) of a test piece (size: 127 mm in length×12.7 mm in width×6.4 mm in thickness) of the same shape which was molded under the same conditions as those in the above (1) was measured at a temperature of 23° C. and a relative humidity of 50% in accordance with a method conforming to ASTM-D790. The larger this numerical value is, the better the rigidity of a molded resin composition is.

(5) Arithmetic Average Roughness (Ra)

A disk-shaped mirror molded article having the same gate structure as that of a compact disk substrate having a radius of 60 mm and a thickness of 1.2 mm was injection-molded. The arithmetic average roughness (Ra) of the disk-shaped mirror molded article was measured at 40 mm away from the center toward the periphery by use of a surface roughness meter (product of Tokyo Seimitsu Co., Ltd., trade name: SURFCOM 1400A) in accordance with JIS B0601-1994.

(6) Light Reflectance

A sample plate (90 mm in length×50 mm in width×2 mm in thickness) obtained by injection molding was measured by a color computer (product of Tokyo Denshoku Co., Ltd., TC-1800MK-II). Its light reflectance was evaluated by use of the value of the lowest reflectance at wavelengths of 450 to 850 nm.

(7) Light Blocking Effect

The total light transmittance of a sample plate (90 mm in length×50 mm in width×1 mm in thickness) obtained by injection molding was measured by use of a haze meter (product of Murakami Color Research Laboratory, HR-100) in accordance with JIS K7361-1.

Examples 1 to 12 and Comparative Examples 1 to 3

In one experiment (Example 4), the components shown in Table 1 were weighed and put into a polyethylene bag in the amounts shown in Table 1, and the bag was fully rotated in vertical and horizontal directions so as to dry-blend the component uniformly. This dry-blended mixture was melt-kneaded by use of a vented twin-screw extruder having a screw diameter of 30 mm [product of The Japan Steel Works, Ltd., trade name: TEX30XSST, fully intermeshing, corotating double threaded screws] so as to produce pellets. The production rate at that time was set at 20,000 g/hr, and the extrusion temperature was set at 250° C. in all sections. Further, the rotation speed of the screws was set at 150 rpm, and the degree of vacuum of the vent was set at 3 kPa. This method is shown in Table 1 as "Method 1".

Meanwhile, in other experiments (Examples 1 to 3 and 5 to 12 and Comparative Examples 2 and 3), pellets were prepared under the same conditions as described above by a method comprising pelletizing the component B and the component C by use of the same apparatus as described above (cylinder temperature: 200° C.) in advance and then mixing the pellets with other components such as the component A. This method is shown in Tables 1 to 4 as "Method 2". However, only in Example 5, the cylinder temperature of the twin-screw extruder was set at 280° C.

Further, in all experiments including Comparative Example 1, the following TMP (trimethyl phosphate) was added in an amount of 0.1 part by weight based on 100 parts by weight of the component A.

The thus obtained pellets were dried by a hot air circulating dryer at 100° C. for 5 hours and then formed into predetermined test pieces (size: 127 mm in length×12.7 mm in width×6.4 mm in thickness) by use of an injection molding machine [product of Sumitomo Heavy Industries, Ltd., trade name: SG-150U]. Molding conditions include a cylinder temperature of 260° C., a mold temperature of 80° C., a molding speed of 30 mm/sec and a pressure of around 50 MPa (however, only in Example 5, the cylinder temperature of the molding machine was set at 280° C., and the mold temperature was set at 100° C.). The results of evaluations of these test pieces are shown in Tables 1 to 4. Symbols representing the above components in Tables 1 to 4 refer to the following materials.

<Component A>

[PC-1]: bisphenol A type aromatic polycarbonate resin powder having a viscosity average molecular weight of 23,800 [product of Teijin Chemicals Ltd., "Panlite L-1250WP"]

[PC-2]: aromatic polycarbonate resin powder produced by the following method and comprising 9,9-bis(3-methyl-4-hydroxyphenyl)fluorene (abbreviated as "BCF") and bisphenol A (abbreviated as "BPA")

[Production Method of PC-2]: 19,580 parts of ion exchange water and 3,850 parts of 48.5-wt % sodium hydroxide aqueous solution were charged into a reactor equipped with a thermometer and an agitator. In the mixture, 1,175 parts of BCF, 2,835 parts of BPA and 9 parts of hydrosulfite were dissolved, and then 13,210 parts of methylene chloride was added to the mixture. Under vigorous agitation, 2,000 parts of phosgene was blown into the resulting mixture at 15° C. in about 40 minutes so as to cause a reaction. After completion of phosgene blowing, the temperature of the mixture was raised to 28° C., and 94 parts of p-t-butyl phenol and 640 parts of sodium hydroxide were added so as to cause emulsification. Then, 6 parts of triethylamine was added, and agitation was continued for 1 hour, whereby the reaction was completed. After completion of the reaction, an organic phase was separated, diluted with methylene chloride, rinsed with water, then made acidic with hydrochloric acid and rinsed with water, and when the conductivity of a water phase became nearly the same as that of the ion exchange water, methylene chloride was evaporated by a kneader, thereby obtaining 4,080 parts of colorless powder of a copolymer having a molar ratio of BCF:BPA of 20:80. The viscosity average molecular weight of this aromatic polycarbonate (PC-2) powder was 20,300. Further, the reaction system was carried out under bubbling of nitrogen and stream of nitrogen and was prevented from contacting with oxygen during the reaction.

<Component B>

[B-1]: organo-modified synthetic fluorine mica produced by the following method and nearly completely ion-exchanged by a dimethyl di-n-decyl ammonium ion (cation exchange capacity of synthetic fluorine mica: 110 milliequivalents/100 g)

[Production Method of B-1]: About 100 parts of synthetic fluorine mica (product of Co-op Chemical Co., Ltd., "SOMASIF ME-100") was weighed accurately and then dispersed into 10,000 parts of water (ion exchange water) of room temperature under agitation. To the dispersion, a chloride of the above onium ion (dimethyl di-n-decyl ammonium chloride) was added in an amount of 1.2 times as many equivalents as the cation exchange equivalent of the synthetic fluorine mica, and the mixture was agitated for 6 hours. The produced solid precipitate was separated by filtration, then washed in 30,000 parts of ion exchange water by agitation and then separated by filtration again. The washing and the filtration were carried out three times, respectively. The obtained solid was air-dried for 5 days, then ground in a mortar, then dried by hot air at 50° C. for 10 hours, and ground in a mortar again until a maximum particle diameter of about 100 μm was obtained. A residual water content evaluated by a reduction in thermogravimetry when kept under a flow of nitrogen at 120° C. for 1 hour by the hot air drying was 3 wt %. Thereby, B-1 was obtained.

[B-2]: organo-modified synthetic fluorine mica produced by the following method and having 55% of cation exchange capacity thereof ion-exchanged by a dimethyl di-n-decyl ammonium ion (cation exchange capacity of synthetic fluorine mica: 110 milliequivalents/100 g)

[Production Method of B-2]: B-2 was produced in the same manner as in the case of the above B-1 except that dimethyl di-n-decyl ammonium chloride was added in an amount of 0.8 times as many equivalents as the cation exchange equivalent of the synthetic fluorine mica in the production method of the above B-1.

[B-3]: organo-modified synthetic fluorine mica produced by the following method and nearly completely ion-exchanged by a dimethyl didodecyl ammonium ion (cation exchange capacity of synthetic fluorine mica: 110 milliequivalents/100 g)

[Production Method of B-3]: B-3 was produced in the same manner as in the case of the above B-1 except that dimethyl di-n-decyl ammonium chloride was changed to dimethyl didodecyl ammonium chloride in the production method of the above B-1.

[B-4]: organo-modified synthetic fluorine mica produced by the following method and nearly completely ion-exchanged by a dimethyl dihexadecyl ammonium ion (cation exchange capacity of synthetic fluorine mica: 110 milliequivalents/100 g)

[Production Method of B-4]: B-4 was produced in the same manner as in the case of the above B-1 except that dimethyl di-n-decyl ammonium chloride was changed to dimethyl dihexadecyl ammonium chloride in the production method of the above B-1.

[B-5]: organo-modified synthetic fluorine mica using dimethyl didecyl ammonium chloride and nearly completely ion-exchanged by a dimethyl didecyl ammonium ion (product of Topy Industries, Ltd., trade name: 4CD10-TS)

<Layer Silicates out of Scope of Present Invention>

For comparison, the following B-6 and B-7 were used as layer silicates ion-exchanged by organic onium ions which were out of the scope of the present invention.

[B-6]: organo-modified synthetic fluorine mica nearly completely ion-exchanged by tri-n-octyl methyl ammonium chloride (product of Co-op Chemical Co., Ltd., "SOMASIF MTE", cation exchange capacity of synthetic fluorine mica: 110 milliequivalents/100 g)

[B-7]: organo-modified synthetic fluorine mica nearly completely ion-exchanged by dimethyl di-n-octadecyl ammonium chloride (product of Co-op Chemical Co., Ltd., "SOMASIF MAE", cation exchange capacity of synthetic fluorine mica: 110 milliequivalents/100 g)

<Component C>

[C-1]: styrene-maleic anhydride copolymer (product of Nova Chemicals Japan Ltd., "DYLARK 332-80", amount of maleic anhydride: about 15 wt %)

[C-2]: (2-isopropenyl-2-oxazoline)-styrene-acrylonitrile copolymer (product of Nippon Shokubai Co., Ltd., "EPOCROS RAS-1005", amount of 2-isopropenyl-2-oxazoline: about 5 wt %)

<Component D>

[D-1]: partial or full ester of a higher fatty acid and a polyhydric alcohol (product of Riken Vitamin Co., Ltd., "RIKEMAL S-100A")

(Other Components)

TMP: trimethyl phosphate (product of DAIHACHI CHEMICAL INDUSTRY CO., LTD., trade name: TMP), added in an amount of 0.1 parts by weight based on 100 parts by weight of the component A in every case.

TABLE 1

| | Component | Symbol | Unit | Ex. 1 | Ex. 2 | Ex. 3 | Ex. 4 |
|---|---|---|---|---|---|---|---|
| Composition | Component A | PC-1 | Parts by Weight | 100 | 100 | 100 | — |
| | | PC-2 | Parts by Weight | — | — | — | 100 |
| | Component B or Similar | B-1 | Parts by Weight | 4.2 | — | 8.5 | 4.2 |
| | Component Thereof | B-2 | Parts by Weight | — | 3.9 | — | — |
| | Component C | C-1 | Parts by Weight | 6 | 6 | 12 | — |
| | | C-2 | Parts by Weight | — | — | — | 6 |
| | Component D | D-1 | Parts by Weight | — | 0.3 | 0.3 | 0.3 |
| | Proportion of Inorganic Material in Component B | | % by Weight | 2.5 | 2.4 | 5.1 | 2.4 |
| | Production Method | | — | Method 2 | Method 2 | Method 2 | Method 1 |
| Properties | Viscosity Average Molecular Weight | | — | 21,300 | 22,100 | 20,200 | 15,800 |
| | $\Delta$M ratio | | % | 14.1 | 9.8 | 12.4 | 14.6 |
| | Surface Appearance | | Visual Evaluation | ○ | ○ | ○ | ○ |
| | Flexural Modulus | | MPa | 3,090 | 3,020 | 3,790 | 3,290 |

Ex.: Example

TABLE 2

| | Component | Symbol | Unit | Ex. 5 | Ex. 6 | Ex. 7 | Ex. 8 |
|---|---|---|---|---|---|---|---|
| Composition | Component A | PC-1 | Parts by Weight | — | 100 | 100 | 100 |
| | | PC-2 | Parts by Weight | 100 | — | — | — |
| | Component B or Similar | B-1 | Parts by Weight | 4.2 | 4.2 | — | — |
| | Component Thereof | B-3 | Parts by Weight | — | — | 4.3 | 4.3 |
| | Component C | C-1 | Parts by Weight | 6 | 6 | 6 | 6 |
| | | C-2 | Parts by Weight | — | — | — | — |
| | Component D | D-1 | Parts by Weight | 0.3 | 0.3 | — | 0.3 |
| | Proportion of Inorganic Material in Component B | | % by Weight | 2.5 | 2.4 | 2.5 | 2.4 |
| | Production Method | | — | Method 2 | Method 2 | Method 2 | Method 2 |
| Properties | Viscosity Average Molecular Weight | | — | 18,600 | 21,400 | 17,800 | 17,700 |
| | $\Delta$M ratio | | % | 9.0 | 12.2 | 28.4 | 24.3 |
| | Surface Appearance | | Visual Evaluation | ○ | ○ | ○ | ○ |
| | Flexural Modulus | | MPa | 3,400 | 3,020 | 3,100 | 3,070 |

Ex.: Example

TABLE 3

| | Component | Symbol | Unit | Ex. 9 | Ex. 10 | Ex. 11 | Ex. 12 |
|---|---|---|---|---|---|---|---|
| Composition | Component A | PC-1 | Parts by Weight | 100 | 100 | 100 | 100 |
| | Component B or Similar | B-1 | Parts by Weight | — | — | — | 6 |
| | Component Thereof | B-4 | Parts by Weight | 4.5 | 4.5 | — | — |
| | | B-5 | Parts by Weight | — | — | 4.1 | — |
| | Component C | C-1 | Parts by Weight | 6 | 6 | 6 | 8.6 |
| | | C-2 | Parts by Weight | — | — | — | — |
| | Component D | D-1 | Parts by Weight | — | 0.3 | 0.3 | 0.3 |
| | Other Component | ABS | Parts by Weight | — | — | — | 43 |
| | Proportion of Inorganic Material in Component B | | % by Weight | 2.5 | 2.4 | 2.4 | 2.4 |
| Properties | Production Method | | — | Method 2 | Method 2 | Method 2 | Method 2 |
| | Viscosity Average Molecular Weight | | — | 17,900 | 17,700 | 21,800 | 23,100 |
| | ΔM ratio | | % | 29.6 | 24.8 | 11.3 | 8.9 |
| | Surface Appearance | | Visual Evaluation | ○ | ○ | ○ | ○ |
| | Flexural Modulus | | MPa | 3,240 | 3,190 | 2,940 | 2,960 |

Ex.: Example

TABLE 4

| | Component | Symbol | Unit | C. Ex. 1 | C. Ex. 2 | C. Ex. 3 |
|---|---|---|---|---|---|---|
| Composition | Component A | PC-1 | Parts by Weight | 100 | 100 | 100 |
| | Components Similar to | B-6 | Parts by Weight | — | 8.7 | — |
| | Component B | B-7 | Parts by Weight | — | — | 4.6 |
| | Component C | C-1 | Parts by Weight | — | 12 | 6 |
| | | C-2 | Parts by Weight | — | — | — |
| | Component D | D-1 | Parts by Weight | — | — | 0.3 |
| | Proportion of Inorganic Material in Component B | | % by Weight | — | 5 | 2.4 |
| Properties | Production Method | | — | — | Method 2 | Method 2 |
| | Viscosity Average Molecular Weight | | — | 23,800 | 19,700 | 17,700 |
| | ΔM ratio | | % | 6.1 | 36.0 | 33.9 |
| | Surface Appearance | | Visual Evaluation | ○ | x | x |
| | Flexural Modulus | | MPa | 2,110 | 3,880 | 3,140 |

C. Ex.: Comparative Example

As is obvious from the results shown in Tables 1 to 4, the aromatic polycarbonate resin compositions (Examples 1 to 12) containing the layer silicates (B-1 to B-5) ion-exchanged by the organic onium ions specified in the present invention undergo only a small decrease in molecular weight when exposed to a high temperature and high humidity environment and show excellent hydrolysis resistance and a high flexural modulus (rigidity), and molded articles thereof have good surface appearances. In contrast, it is obvious that the ordinary aromatic polycarbonate resin (Comparative Example 1) containing no layer silicate has poor rigidity and that the resin compositions (Comparative Examples 2 and 3) containing the layer silicates (B-6 and B-7) ion-exchanged by the organic onium ions different from those specified in the present invention have improved rigidity, but molded articles thereof show poor hydrolysis resistance when exposed to a high temperature and high humidity environment and also have poor surface appearances.

Example 13

Aluminum was vacuum-deposited on an article molded by use of the pellets obtained in Example 5 to a thickness of 0.5 μm by use of a vacuum deposition apparatus (A6425, product of Chuo Riken Co., Ltd.) so as to prepare a mirror. The surface of the mirror shows good smoothness, and no distortion of reflected image was observed visually. When its arithmetic average roughness Ra was measured, it was 0.01 μm.

Examples 14 and 15

In Example 14, the components shown in Table 5 were extruded and molded in the same manner as in Example 1 so as to obtain a molded article, and in Example 15, the components shown in Table 5 were extruded and molded in the same manner as in Example 5 so as to obtain a molded article. The results of evaluations on these molded articles are shown in Table 5. Further, symbols shown in Table 5 other than those described above represent the following components.

[TiO2]: titanium dioxide pigment surface-treated with methyl hydrogen siloxane (product of Ishihara Sangyo Co., Ltd., "TIPAQUE PC-3")

[EPQ]: phosphorus-based stabilizer composed essentially of phosphonite (product of Clariant Japan, "Sandstab P-EPQ")

[PSR]: coumarin-based fluorescent brightener (product of Hakkol Chemical Co., Ltd., "Hakkol PSR-B")

[UVA]: benzotriazole-based ultraviolet absorber (product of Chemipro Kasei Co., Ltd., "Kemisorb 79")

TABLE 5

| | Component | Symbol | Unit | Ex. 14 | Ex. 15 |
|---|---|---|---|---|---|
| Composition | Component A | PC-1 | Parts by Weight | 100 | — |
| | | PC-2 | Parts by Weight | — | 100 |
| | Component B | B-1 | Parts by Weight | 4.3 | 4.3 |
| | Component C | C-1 | Parts by Weight | 6 | 6 |
| | TiO2 | | Parts by Weight | 12 | 12 |
| | EPQ | | Parts by Weight | 0.05 | 0.05 |
| | PSR | | Parts by Weight | 0.02 | 0.02 |
| | UVA | | Parts by Weight | 0.2 | 0.2 |
| | TMP | | Parts by Weight | 0.1 | 0.1 |
| | Proportion of Inorganic Material in Component B | | % by Weight | 2.3 | 2.3 |
| | Production Method | — | | Method 2 | Method 2 |
| Properties | Viscosity Average Molecular Weight | — | | 21,100 | 18,000 |
| | ΔM ratio | | % | 12.0 | 8.8 |
| | Surface Appearance | | Visual Evaluation | ○ | ○ |
| | Flexural Modulus | | MPa | 3,400 | 3,850 |
| | Surface Roughness (Ra) | | μm | 0.03 | 0.03 |
| | Lighy Reflectance | | % | 88 | 87 |
| | Light Blocking Effect | | % | 1.1 | 1.1 |

Ex.: Example

It is understood from the results shown in Table 5 that the compositions of Examples 14 and 15 undergo not only a small decrease in molecular weight when exposed to a high temperature and high humidity environment, but also have excellent hydrolysis resistance, show a high flexural modulus (rigidity) and have excellent optical properties, and molded articles thereof have good surface appearances. Further, from the compositions of Examples 14 and 15, backlights for 7-inch liquid crystal displays were molded under similar conditions. The molded articles obtained showed good surface smoothness and good light reflectance.

Effect of the Invention

The resin compositions I and II of the present invention have high rigidity which has not heretofore been achieved and have good thermal stability and good hydrolysis resistance. Further, the resin compositions I and II also have such advantages that they have good moldability and give a molded article having a good surface appearance, particularly good surface smoothness.

According to the production method of the present invention, an aromatic polycarbonate resin composition having high rigidity and good hydrolysis resistance is provided by using a specific layer silicate which is a component B to an aromatic polycarbonate.

According to the use of (or the method of using) the present invention, rigidity can be imparted to an aromatic polycarbonate resin composition while deterioration in the hydrolysis resistance of the composition is prevented. According to the use of (or the method of using) the present invention for producing an aromatic polycarbonate resin composition, an aromatic polycarbonate resin composition having improved hydrolysis resistance can be produced.

According to the additive of the present invention for improving physical properties, rigidity can be imparted to an aromatic polycarbonate resin composition while deterioration in hydrolysis resistance is prevented.

The molded article of the present invention is useful in various applications such as optical disks, various electronic and electric parts, office automation equipment, automobile parts, machine parts, agricultural materials, fishing materials, shipping containers, packaging containers and miscellaneous goods.

INDUSTRIAL FEASIBILITY

The resin composition I or II of the present invention is useful in a wide variety of applications such as various electronic and electric devices, office automation equipment, automobile parts, machine parts, agricultural materials, fishing materials, shipping containers, packaging containers and miscellaneous goods. The compositions are extremely valuable from an industrial standpoint.

The invention claimed is:

1. An aromatic polycarbonate resin composition comprising:
    (A) an aromatic polycarbonate (component A)
    (B) a layer silicate (component B) having 50 to 200 milliequivalents/100 g of cation exchange capacity and ion-exchanged by an organic onium ion represented by the following general formula (I):

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), the content of the component B being 0.1 to 20 parts by weight based on 100 parts by weight of the component A,
    (C) a compound (component C) having an affinity for the aromatic polycarbonate (component A) and having a hydrophilic component, the content of the component C being 0.1 to 50 parts by weight based on 100 parts by weight of the component A, and
    (D) a partial ester and/or a full ester (component D) of a higher fatty acid and a polyhydric alcohol, the component D being 0.005 to 1 part by weight based on 100 parts by weight of the component A.

2. The composition of claim 1, wherein $R^1$ and $R^2$ in the general formula (I) relating to the component B are an alkyl group having 8 to 11 carbon atoms.

3. The composition of claim 1, wherein $R^3$ and $R^4$ in the general formula (I) relating to the component B are a methyl group or an ethyl group.

4. The composition of claim 1, wherein M in the general formula (I) relating to the component B is a nitrogen atom.

5. The composition of claim 1, wherein the component C is a polymer having an affinity for the aromatic polycarbonate (component A) and having a functional group comprising a carboxyl group and/or a derivative thereof.

6. The composition of claim 5, wherein the component C is a styrene-containing polymer (component C-1) having a functional group comprising a carboxyl group and/or a derivative thereof.

7. The composition of claim 6, wherein the component C-1 is a styrene-maleic anhydride copolymer.

8. The composition of claim 1, wherein the higher fatty acid of the component D is an aliphatic carboxylic acid having 10 to 32 carbon atoms, and the polyhydric alcohol is an aliphatic alcohol having 3 to 32 carbon atoms.

9. The composition of claim 1, wherein the component D is a partial ester of a higher fatty acid and a polyhydric alcohol.

10. An aromatic polycarbonate resin composition comprising:
   (A) an aromatic polycarbonate (component A)
   (B) a layer silicate (component B) having 50 to 200 milliequivalents/100 g of cation exchange capacity and ion-exchanged by an organic onium ion represented by the following general formula (I):

(wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other), the content of the component B being 0.1 to 20 parts by weight based on 100 parts by weight of the component A, and
   (C) a compound (component C) having an affinity for the aromatic polycarbonate (component A) and having a hydrophilic component, the content of the component C being 0.1 to 50 parts by weight based on 100 parts by weight of the component A.

11. The composition of claim 10, wherein $R^1$ and $R^2$ in the general formula (I) relating to the component B are an alkyl group having 8 to 11 carbon atoms.

12. The composition of claim 10, wherein the component C is a polymer having an affinity for the aromatic polycarbonate (component A) and having a functional group comprising a carboxyl group and/or a derivative thereof.

13. The composition of claim 12, wherein the component C is a styrene-containing polymer (component C-1) having a functional group comprising a carboxyl group and/or a derivative thereof.

14. The composition of claim 13, wherein the component C-1 is a styrene-maleic anhydride copolymer.

15. A method for producing an aromatic polycarbonate resin composition which comprises mixing (A) 100 parts by weight of aromatic polycarbonate (component A), (B) 0.1 to 20 parts by weight of layer silicate and (C) 0.1 to 50 parts by weight of compound (component C) having an affinity for the aromatic polycarbonate (component A) and having a hydrophilic component,
wherein as the layer silicate, a layer silicate (component B) having 50 to 200 milliequivalents/100 g of cation exchange capacity and ion-exchanged by an organic onium ion represented by the following formula (I):

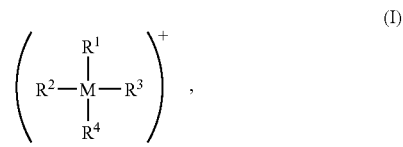

wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other, to improve hydrolysis resistance of said composition.

16. The method of claim 15, wherein $R^1$ and $R^2$ in the general formula (I) relating to the component B are an alkyl group having 7 to 14 carbon atoms.

17. The method of claim 15, wherein the mixing is melt-kneading.

18. The method of claim 15, wherein the component C is a polymer having an affinity for the aromatic polycarbonate (component A) and having a functional group comprising a carboxyl group and/or a derivative thereof.

19. The method of claim 18, wherein the component C is a styrene-containing polymer (component C-1) having a functional group comprising a carboxyl group and/or a derivative thereof.

20. The method of claim 18, wherein the component C-1 is a styrene-maleic anhydride copolymer.

21. The method of claim 15, wherein the component B and the component C are melt-kneaded in advance so as to obtain a melt-kneaded mixture which is then melt-kneaded with the component A.

22. The method of claim 15, wherein the aromatic polycarbonate resin composition is produced by further mixing (D) a partial ester and/or a full ester (component D) of a higher fatty acid and a polyhydric alcohol in an amount of 0.005 to 1 part by weight based on 100 parts by weight of the component A.

23. An additive for improving the physical properties of an aromatic polycarbonate resin, the additive comprising (C) 100 parts by weight of compound (component C) having an affinity for an aromatic polycarbonate (component A) and having a hydrophilic component and (B) 1 to 300 parts by weight of layer silicate (component B) having 50 to 200 milliequivalents/100 g of cation exchange capacity and ion-exchanged by an organic onium ion represented by the following general formula (I):

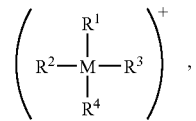

wherein M represents a nitrogen atom or a phosphorus atom, $R^1$ and $R^2$ represent an alkyl group having 6 to 16 carbon atoms and may be the same as or different from each other, and $R^3$ and $R^4$ represent an alkyl group having 1 to 4 carbon atoms and may be the same as or different from each other.

24. A molded article produced by injection-molding the aromatic polycarbonate resin composition of claim 1.

25. A molded article produced by injection-molding the aromatic polycarbonate resin composition of claim 10.

* * * * *